(12) United States Patent
Hayashi et al.

(10) Patent No.: US 10,607,653 B2
(45) Date of Patent: Mar. 31, 2020

(54) IMAGE PROCESSING METHOD, IMAGE PROCESSING APPARATUS, AND PROGRAM

(71) Applicant: Sony Corporation, Tokyo (JP)

(72) Inventors: Naoki Hayashi, Chiba (JP); Shintaro Kajiwara, Tokyo (JP); Yoshitaka Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/740,495

(22) PCT Filed: May 23, 2016

(86) PCT No.: PCT/JP2016/065155
§ 371 (c)(1),
(2) Date: Dec. 28, 2017

(87) PCT Pub. No.: WO2017/029849
PCT Pub. Date: Feb. 23, 2017

(65) Prior Publication Data
US 2018/0190325 A1   Jul. 5, 2018

(30) Foreign Application Priority Data

Aug. 20, 2015   (JP) .................................. 2015-162581

(51) Int. Cl.
*G11B 27/34*   (2006.01)
*G11B 20/10*   (2006.01)
*H04N 5/91*   (2006.01)
*G11B 27/031*   (2006.01)

(52) U.S. Cl.
CPC .............. *G11B 27/34* (2013.01); *G11B 20/10* (2013.01); *G11B 27/031* (2013.01); *H04N 5/91* (2013.01)

(58) Field of Classification Search
CPC ....... G11B 27/34; G11B 20/10; G11B 27/031; H04N 5/91
See application file for complete search history.

(56) References Cited

U.S. PATENT DOCUMENTS

| 2004/0230558 A1* | 11/2004 | Tokunaka | G11B 27/105 |
| 2004/0268223 A1* | 12/2004 | Tojo | G06F 17/30843 |
| | | | 715/255 |
| 2005/0022254 A1* | 1/2005 | Adolph | G11B 27/034 |
| | | | 725/135 |

(Continued)

FOREIGN PATENT DOCUMENTS

| JP | 2007-134770 A | 5/2007 |
| JP | 2011-030159 A | 2/2011 |

(Continued)

*Primary Examiner* — Thai Q Tran
*Assistant Examiner* — Sunghyoun Park
(74) *Attorney, Agent, or Firm* — Michael Best & Friedrich LLP

(57) ABSTRACT

To improve usability and edit efficiency of video data editing based on additional information, additional information added according to a time axis of video data is first recognized. An edit range of the video data is then set according to whether the additional information is first additional information for designating a specific point in time in the time axis of the video or second additional information for designating a specific time range in the time axis of the video. Therefore, a part to be handled as the edit range is set according to the additional data.

18 Claims, 14 Drawing Sheets

(56) References Cited

U.S. PATENT DOCUMENTS

2009/0198713 A1* 8/2009 Sato .................. H04N 5/913
2011/0025711 A1* 2/2011 Doi ................... G06F 3/0485
                                                                                                                     345/635

FOREIGN PATENT DOCUMENTS

| JP | 2011-155329 A | 8/2011 |
| JP | 2013-135354 A | 7/2013 |
| JP | 2013-239796 A | 11/2013 |

* cited by examiner 70 (COMPUTER APPARATUS)

FIG. 11
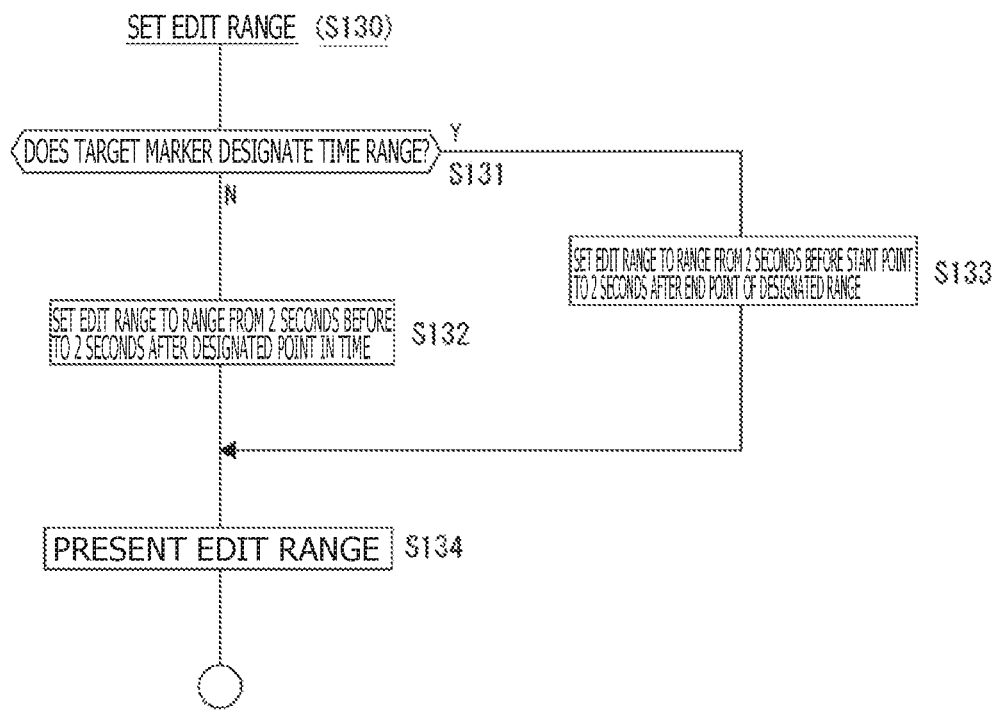
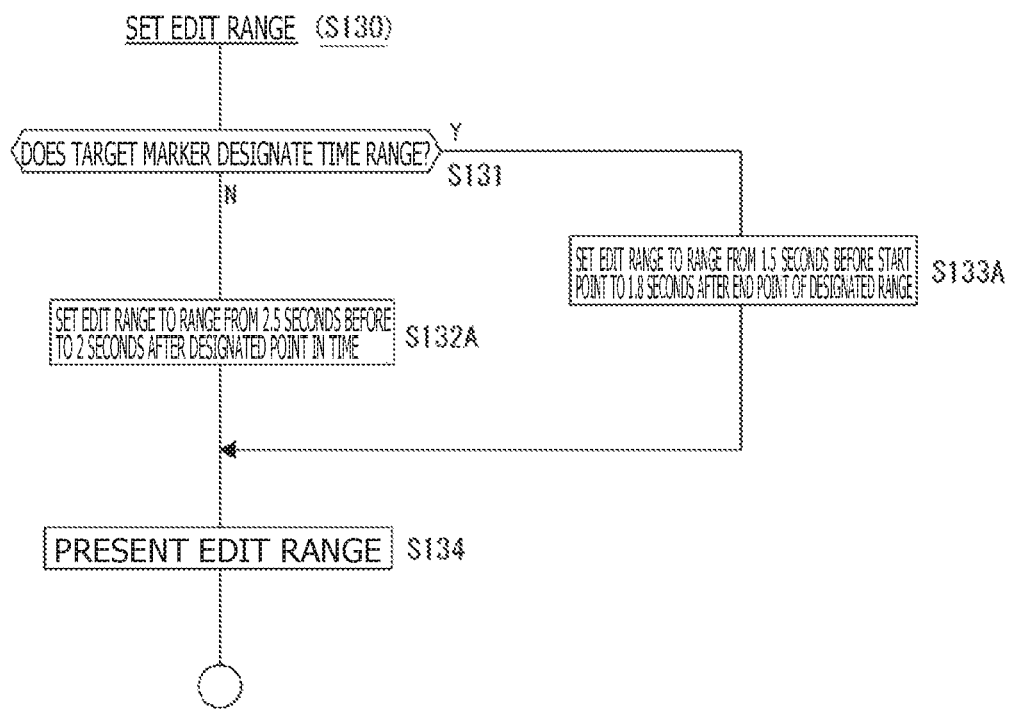

IMAGE PROCESSING METHOD, IMAGE PROCESSING APPARATUS, AND PROGRAM

TECHNICAL FIELD

The present technique relates to an image processing method, an image processing apparatus, and a program, and particularly, to a technical field regarding an editing process of video data.

CITATION LIST

Patent Literature

[PTL 1]
  JP 2011-030159A

BACKGROUND ART

Using video cameras and the like to shoot videos has become popular, and the amount of video data owned by the users is also increasing. Under the circumstances, means for general users to edit the video data is provided by, for example, an application program for personal computer, and the work of video editing has also become popular.

For example, a technique regarding video editing is disclosed in PTL 1.

SUMMARY

Technical Problem

For the general users to more easily enjoy the video editing, the operation for editing needs to be simple, and the operation needs to be easy to understand. Furthermore, it is desirable to be able to provide or propose editing results desired by the users through some automatic processing.

Accordingly, an object of the present technique is to propose a method, in which an efficient editing process using additional data can be provided to the user, and an edit range can be appropriately set.

Solution to Problem

An image processing method according to the present technique is an image processing method including recognizing additional information added according to a time axis of video data, and setting an edit range of the video data according to whether the additional information is first additional information for designating a specific point in time in the time axis of the video or second additional information for designating a specific time range in the time axis of the video.

Therefore, the edit range is set according to at least two types of additional information (first and second additional information).

The image processing method further includes setting the edit range based on the specific point in time designated by the first additional information when the additional information is the first additional information, and setting the edit range based on a start point and an end point of the specific time range designated by the second additional information when the additional information is the second additional information.

The first additional information indicates a specific point in time, and the edit range is set based on the specific point in time. The second additional information indicates a specific time range, and the edit range is set based on the start point and the end point of the time range.

The image processing method further includes setting the edit range to a range from a point in time that is a first set time period before the specific point in time to a point in time that is a second set time period after the specific point in time according to the first additional information, and setting the edit range to a range from a point in time that is a third set time period before the start point of the time range to a point in time that is a fourth set time period after the end point of the time range according to the second additional information.

The first set time period, the second set time period, the third set time period, and the fourth set time period are used for the edit range according to two types of additional information (first and second additional information). It should be noted that the respective time lengths of the first set time period, the second set time period, the third set time period, and the fourth set time period may be the same or may be different.

The image processing method further includes setting the set edit range as a range cut from the video data.

Therefore, the set edit range is used as edited video data obtained by editing the original video data.

The image processing method further includes controlling display to display and present the edit range set for the video data.

For example, the edit range is presented and displayed while the video data is displayed from the start to the end in a bar format or the like.

The image processing method further includes controlling the display to present the specific point in time in the video data designated by the first additional information.

For example, a mark or the like indicating the first additional information is displayed on the bar format indicating the video data.

The image processing method further includes controlling the display to indicate a representative point in time to present the specific time range in the video data designated by the second additional information.

For example, a mark or the like indicating the second additional information is displayed on the bar format indicating the video data.

The image processing method further includes controlling the display to reproduce and display the video based on information of the set edit range.

Therefore, while one or a plurality of edit ranges are set for the video data, the edit ranges are cut to reproduce and display the edit ranges. For example, the plurality of edit ranges are sequentially cut to continuously reproduce the video.

The image processing method further includes executing an edit operation corresponding process of changing the setting of the set edit range according to an operation.

Therefore, the user can perform an operation to arbitrarily change the setting of the edit range set for the video data. For example, the user operation is allowed to change the start point (in-point) or the end point (out-point) of the edit range, delete an edit range, and add an edit range.

The image processing method further includes executing an edit operation corresponding process of changing an image reproduction mode of the set edit range according to an operation.

The edit range set for the video data is added to the edited video as a video for normal reproduction, such as a video for normal display at 1× speed. The user operation is allowed to add processes, such as variable speed reproduction and image effect, to the video of the edit range.

The image processing method further includes executing an edit operation corresponding process of designating a kind of a plurality of types of additional information as additional information serving as the first additional information or the second additional information and, according to the designation, setting a predetermined image reproduction mode in the edit ranges corresponding to the designated kind of additional information.

Therefore, the kind of additional information is designated to set a common image reproduction mode for the part corresponding to the additional information. For example, slow reproduction or the like is designated for all of the edit ranges corresponding to specific additional information.

The image processing method further includes variably setting one of the first set time period, the second set time period, the third set time period, and the fourth set time period according to a kind of a plurality of types of additional information as additional information serving as the first additional information or the second additional information in setting the edit range of the video data.

Therefore, the set time period for determining the edit range is changed according to the kind of additional information.

The image processing method further includes setting one of the first set time period and the third set time period to a time length longer than a normally set time length when the kind of the additional information is additional information added according to a user operation during video shooting.

The designated time period position of the additional information set according to the user operation is usually delayed. Therefore, a longer time length is set for the additional information.

The image processing method further includes executing an output process of generating and outputting edited video data based on the information of the set edit range.

While one or a plurality of edit ranges are set for the video data, or while the edit ranges are further changed, the edit ranges are cut and connected to generate the edited video data, for example.

The image processing method further includes in the output process, executing an output process of storing the edited video data in a storage medium.

Alternatively, the image processing method further includes in the output process, executing an output process of transmitting the edited video data to an external device.

Therefore, the edited video data is saved and stored in the storage medium, or the edited video data is transmitted to the external device. In the case of the transmission, examples of the transmission destination include a specific recording device, an information processing terminal, and a cloud server.

The present technique provides an image processing apparatus including a recognition unit that recognizes additional information added according to a time axis of video data, and an edit processing unit that sets an edit range of the video data according to whether the additional information recognized by the recognition unit is first additional information for designating a specific point in time in the time axis of the video or second additional information for designating a specific time range in the time axis of the video.

This constitutes an apparatus that can execute the image processing method.

A program according to the present technique is a program causing an information processing apparatus to execute a step of recognizing additional information added according to a time axis of video data, and a step of setting an edit range of the video data according to whether the recognized additional information is first additional information for designating a specific point in time in the time axis of the video or second additional information for designating a specific time range in the time axis of the video.

This allows the information processing apparatus to execute the image processing method.

Advantageous Effect of Invention

According to the present technique, the edit range can be automatically set according to each piece of information including the first additional information indicating the specific point in time and the second additional information indicating the specific time range. Therefore, the editing work of the user is simplified, and the edit range is appropriately set according to the additional information.

Note that the advantageous effects described here may not be limited, and the present technique may have any of the advantageous effects described in the present disclosure.

BRIEF DESCRIPTION OF DRAWINGS

FIG. 11 is a flow chart of an edit range setting process according to the embodiment.

DESCRIPTION OF EMBODIMENT

Figure 1:
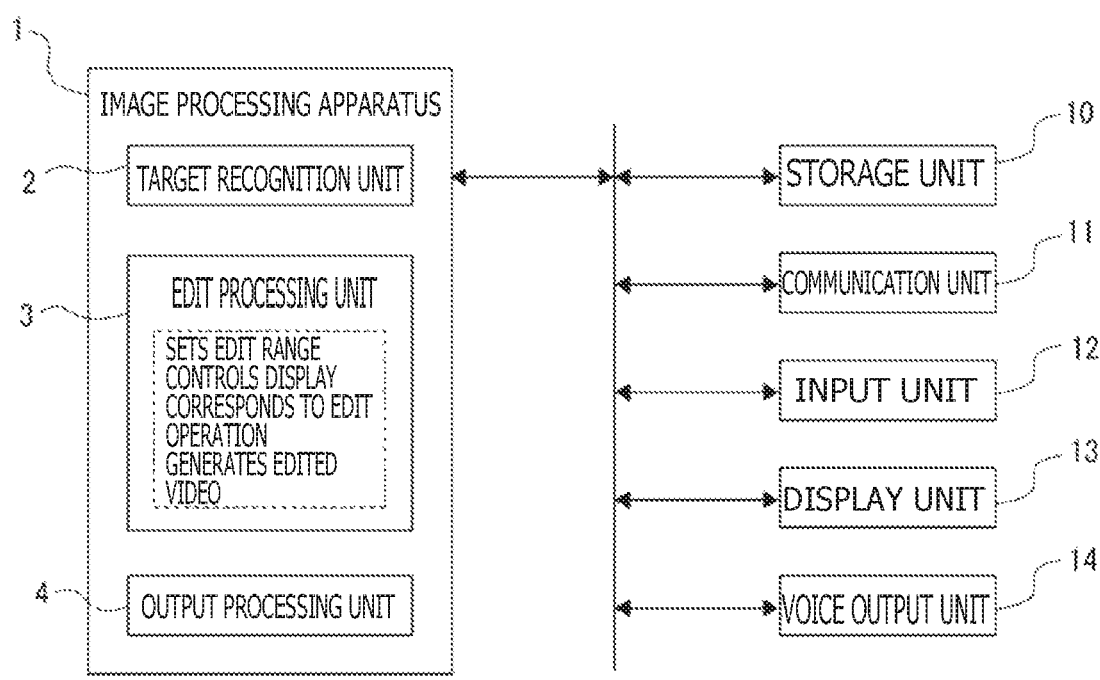
FIG. 1 is a block diagram of an image processing apparatus according to an embodiment of the present technique.

Hereinafter, an embodiment will be described in the following order.
<1. Configuration of Image Processing Apparatus>
<2. Metadata>
<3. Edit Screen Example>
<4. Process Example>
<5. Program and Storage Medium>
<6. Summary and Modification>

1. Configuration of Image Processing Apparatus

A configuration of an image processing apparatus 1 according to an embodiment will be described with reference to FIG. 1. The image processing apparatus 1 is realized by software in an information processing apparatus, such as a personal computer and a mobile terminal (for example, a smartphone or a tablet terminal). The image processing apparatus 1 may also be built in a device, such as an image pickup apparatus like a video camera, an image recording apparatus, an image reproducing apparatus, and an image display apparatus. The image processing apparatus 1 may also be realized as an image editing apparatus.

The image processing apparatus 1 of the embodiment has functions of a target recognition unit 2, an edit processing unit 3, and an output processing unit 4.

Further, peripheral parts that exchange information with the image processing apparatus 1 include a storage unit 10, a communication unit 11, an input unit 12, a display unit 13, a voice output unit 14, and the like.

It should be noted that, although the storage unit 10, the communication unit 11, the input unit 12, the display unit 13, and the voice output unit 14 may each be a single device, the units may be constituent parts in the apparatus, such as the information processing apparatus, the image pickup apparatus, and the image recording apparatus.

Furthermore, all or part of the storage unit 10, the communication unit 11, the input unit 12, the display unit 13, and the voice output unit 14 and the image processing apparatus 1 may be integrally provided in the same device or may be provided as different devices and connected through wired or wireless communication.

First, the peripheral parts will be described.

The storage unit 10 is a storage area for storing video data. For example, the storage unit 10 may be formed by a semiconductor memory, such as a D-RAM (Dynamic Random Access Memory), an S-RAM (Static Random Access Memory), and a flash memory or may be a disk drive for an HDD (Hard Disk Drive), a memory card drive, an optical disk, or the like.

The storage unit 10 stores, for example, video data picked up by a user using an image pickup apparatus, such as a video camera, or video data forwarded from another device. The storage unit 10 is also used to store video data edited by the image editing apparatus 1.

The communication unit 11 communicates with an external device through, for example, public network communication such as the Internet, dedicated line communication, short-range wireless communication, wired communication, or the like. The communication unit 11 transmits, for example, video data edited by the image editing apparatus 1 to an external device, a network server, or the like. The communication unit 11 can also store video data received from an external device, a network server, or the like in the storage unit 10.

The input unit 12 is an input unit of operation information of the user for the image processing apparatus 1. Specific modes of the input unit 12 include a keyboard, a mouse, a touch panel, a gesture detection apparatus, an operation key, and a dial.

The display unit 13 displays images for editing work by the image processing apparatus 1, a reproduced video, and the like. The display unit 13 is configured by, for example, a display device, such as a liquid crystal panel and an organic EL (Electroluminescence) panel.

The voice output unit 14 includes, for example, an amplification unit and a speaker, and outputs, for example, voice accompanying a video when the video is reproduced by the image processing apparatus 1.

The image processing apparatus 1 provides a video editing function to the user in collaboration with the peripheral parts.

The target recognition unit 2 of the image processing apparatus 1 specifies video data to be processed and recognizes additional information (metadata) added according to a time axis of the video data. Specifically, the target recognition unit 2 specifies a piece of video data stored in the storage unit 10 according to a user operation.

Various kinds of metadata are added to the video data during shooting, during analysis after the shooting, and the like. Here, the target recognition unit 2 particularly recognizes the metadata provided according to a scene in the video.

Although the metadata can be various kinds of data, the metadata in the present embodiment is, for example, metadata for marking a scene including a person, a scene in which there is a cheer, a scene in which a smile is detected, a scene based on a user operation, and the like on the time axis of the video data. Therefore, metadata (for example, various markers described later) indicating specific scenes on the time axis of the video data is the target.

Note that the metadata described in the present embodiment includes data (first additional information) for designating a specific point in time on the time axis of the video and data (second additional information) for designating a specific time range on the time axis of the video.

The edit processing unit 3 executes processes for various types of editing of the video data targeted by the target recognition unit 2. For example, the edit processing unit 3 executes processes of presenting the video to the user, presenting the markers indicating the positions of the metadata, setting edit ranges, providing an operation environment for editing, generating edited video data, and the like.

Therefore, the edit processing unit 3 executes an edit range setting process according to the metadata, a display process for a user interface, an edit operation corresponding process according to the edit operation by the user, an edited video generation process of generating edited video data of an editing result, and the like. Specific examples of the processes by the image processing apparatus 1 including these processes will be described later.

The output processing unit 4 executes a process of outputting the edited video data generated by the edit processing unit 3. For example, the output processing unit 4 outputs and stores the data in the storage unit 10. Alternatively, the output processing unit 4 outputs the data to the communication unit 11 and causes the communication unit 11 to transmit the data to an external apparatus.

It should be noted that, although the image processing apparatus 1 includes the target recognition unit 2, the edit processing unit 3, and the output processing unit 4 in FIG. 1, it is only necessary for the image processing apparatus 1 to include at least the target recognition unit 2 that recognizes the metadata serving as the first additional information and the second additional information and the edit processing unit 3 that executes at least the edit range setting process of setting the edit range of the video data according to the first additional information or the second additional information.

Figure 2:
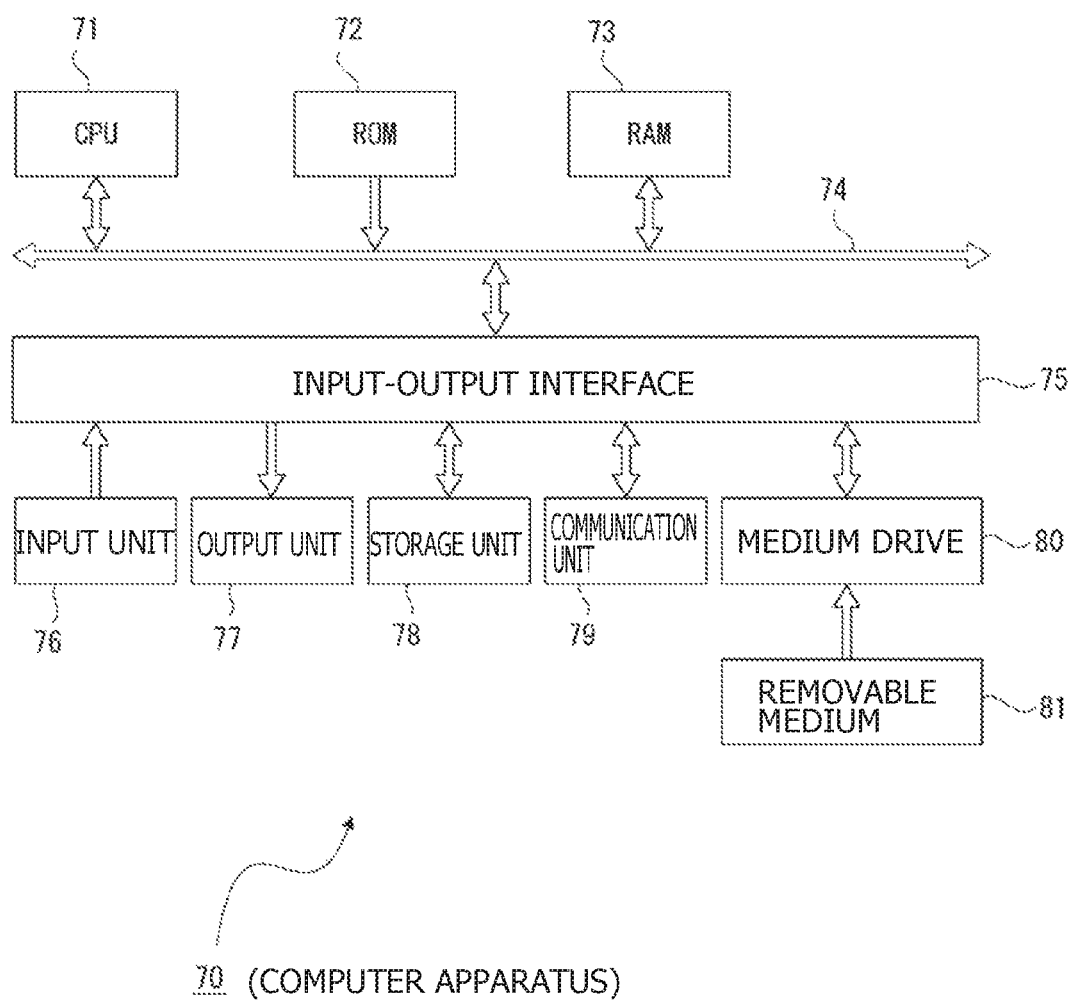
FIG. 2 is a block diagram of a hardware configuration for realizing the image processing apparatus according to the embodiment.

FIG. 2 depicts an example of a computer apparatus 70 as an example of a device that realizes the image processing apparatus 1.

In FIG. 2, a CPU (Central Processing Unit) 71 of the computer apparatus 70 executes various processes according to a program stored in a ROM (Read Only Memory) 72 or a program loaded on a RAM (Random Access Memory) 73 from a storage unit 78. Data and the like necessary for the CPU 71 to execute various processes are also appropriately stored in the RAM 73.

The CPU 71, the ROM 72, and the RAM 73 are connected to each other through a bus 74. An input-output interface 75 is also connected to the bus 74.

An input unit 76 including a keyboard, a mouse, and the like, an output unit 77 including a display constituted by a liquid crystal panel, an organic EL panel, or the like, a speaker, and the like, a storage unit 78 including an HDD and the like, and a communication unit 79 configured by a modem and the like are connected to the input-output interface 75. The communication unit 79 executes a communication process through a network including the Internet.

A medium drive 80 is also connected to the input-output interface 75 as necessary, and a removable medium 81, such as a magnetic disk, an optical disk, a magneto-optical disk, and a semiconductor memory, is appropriately installed. Computer programs read from the medium drive 80 and the removable medium 81 are installed on the storage unit 78 as necessary.

In the case of the computer apparatus 70, the image processing apparatus 1 is realized by software started by the CPU 71. A program configuring the software is downloaded from a network or is read from the removable medium 81 and installed on the computer apparatus 70. Alternatively, the program may be stored in advance in an HDD or the like serving as the storage unit 78.

The CPU 71 starts the program to realize the function of the image processing apparatus 1. An editing process regarding the video data can be executed.

2. Metadata

Information added as metadata to the video data will be described. As described, the metadata (first additional information and second additional information) of the present embodiment has a function of indicating a scene on the time axis of the video data. Examples of specific types include the following.

First, examples of the first additional information for designating a specific point in time will be listed.

Still Image Recording Marker

This is data indicating a point in time of still image recording during video shooting. In some of the image pickup apparatuses (such as video cameras) of recent years, the user can perform a still image recording operation during video recording. A scene for which the user has instructed still image recording during the video recording can be a scene that the user recognizes as an important scene. Therefore, the image pickup apparatus provides a still image recording marker according to the point in time (time code) of the still image recording operation performed by the user during the video shooting.

Face Detection Marker

This is a marker provided to a time code at which a face is detected in the video data. The face detection is performed in image analysis during the video shooting or after the shooting, and the face detection marker is set according to the time code of a frame including the face. For example, an image pickup apparatus, a reproducing apparatus, or the like having an image analysis function sets the face detection marker.

Smile Detection Marker

This is a marker provided to a time code at which a smile is detected in the video data. The smile detection is performed in image analysis during the video shooting or after the shooting, and the smile detection marker is set according to the time code of a frame including the smile. For example, an image pickup apparatus, a reproducing apparatus, or the like having an image analysis function sets the smile detection marker.

Highlight Marker

This is a marker indicating a point in time of a highlight operation by the user during the video shooting. In some of the image pickup apparatuses (such as video cameras) of recent years, the user can perform a highlight operation in an important scene during video recording. More specifically, the highlight operation is an operation of providing a marker to a scene that the user thinks important so that the scene can be immediately designated in subsequent reproduce or edit. For example, the image pickup apparatus provides the highlight marker according to a point in time (time code) of the highlight operation performed by the user during the video shooting.

Next, examples of the second additional information for designating a specific time range will be listed.

Cheer marker

Laughter marker

Clapping marker

Usually, the voice is also collected and recorded during the video shooting, and the input voice can be analyzed to determine, for example, a period in which there is a cheer, a period in which there is laughter, and a period in which there is clapping. An image pickup apparatus, a reproducing apparatus, or the like having a voice analysis function can detect the periods and add a cheer marker, a laughter marker, a clapping marker, and the like to the video data.

Zoom Marker

Image pickup apparatuses are often provided with zoom functions. A period in which the user performs a zoom operation is likely to be a scene important for the user. Therefore, the image pickup apparatus sets a zoom marker for the period of the zoom operation performed during the video shooting and recording.

Motion Pattern Marker

This is a marker added to a specific motion pattern, such as a jumping motion and a turning motion of a person and a swinging motion in tennis, baseball, or golf. For example, a period in which the person is jumping is designated as a jump marker. Although the markers can be set by image analysis, the markers can also be set for a variety of motions in collaboration with an external device, for example. For example, a sensor can be installed on a tennis racket, and information of the sensor can be acquired to discriminate a forehand stroke, a forehand volley, a backhand stroke, a backhand volley, and the like. Markers corresponding to these can be added.

Although the specific examples of the markers (metadata) serving as the first additional information and the second additional information are listed, these are obviously just examples, and there can be various other specific examples. Further, not all of the listed markers have to be used in the processes described later, and only part of the markers may be used.

Examples of the recording method of the markers (metadata) for the video data include the following.

The image pickup apparatus detects the information during the video shooting, and the image pickup apparatus records the markers.

When the markers are to be recording during the video shooting, the image pickup apparatus records and adds the markers to the video data based on the information detected by the image pickup apparatus.

An apparatus other than the image pickup apparatus detects the information during the video shooting, and the image pickup apparatus records the markers.

During the video shooting by the image pickup apparatus, a specific motion or the like of an object is detected by, for example, an external sensor or an external device, and the detected information is transmitted to the image pickup apparatus. The image pickup apparatus sets the markers based on the detected information and stores the markers as metadata corresponding to the video data.

An apparatus other than the image pickup apparatus detects the information during the video shooting, and a device other than the image pickup apparatus records the markers.

During the video shooting by the image pickup apparatus, a specific motion or the like of an object is detected by, for example, an external sensor or an external device, and the detected information is transmitted to a device other than the image pickup apparatus. For example, the detected information is transmitted to a device, such as a smartphone, possessed by the user along with the image pickup apparatus. The device, such as a smartphone, sets the markers based on the detected information. The device also acquires information from the image pickup apparatus and records the markers as metadata synchronized with the time codes of the video data during shooting.

An apparatus other than the image pickup apparatus detects the information during the video shooting, and the markers are recorded on a network.

During the video shooting by the image pickup apparatus, a specific motion or the like of an object is detected by, for example, an external sensor or an external device, and the detected information is transmitted through a network and recorded in a cloud. The cloud server side records the markers as metadata synchronized with the time codes of the video data during shooting.

An editing device records the markers after shooting.

After the shooting, a device having an image and voice analysis function analyzes the video data and the voice data and detects specific points in time and periods as targets of the markers. The device sets the markers according to the time codes and records the markers as metadata.

Alternatively, even in a device without the analysis function, the user manually performs an operation of checking the scenes in the video and designating points in time or periods. The device records the markers as metadata according to the operation.

3. Edit Screen Example

Next, an edit screen provided to the user by the image processing apparatus 1 of the embodiment will be described.

Figure 3:
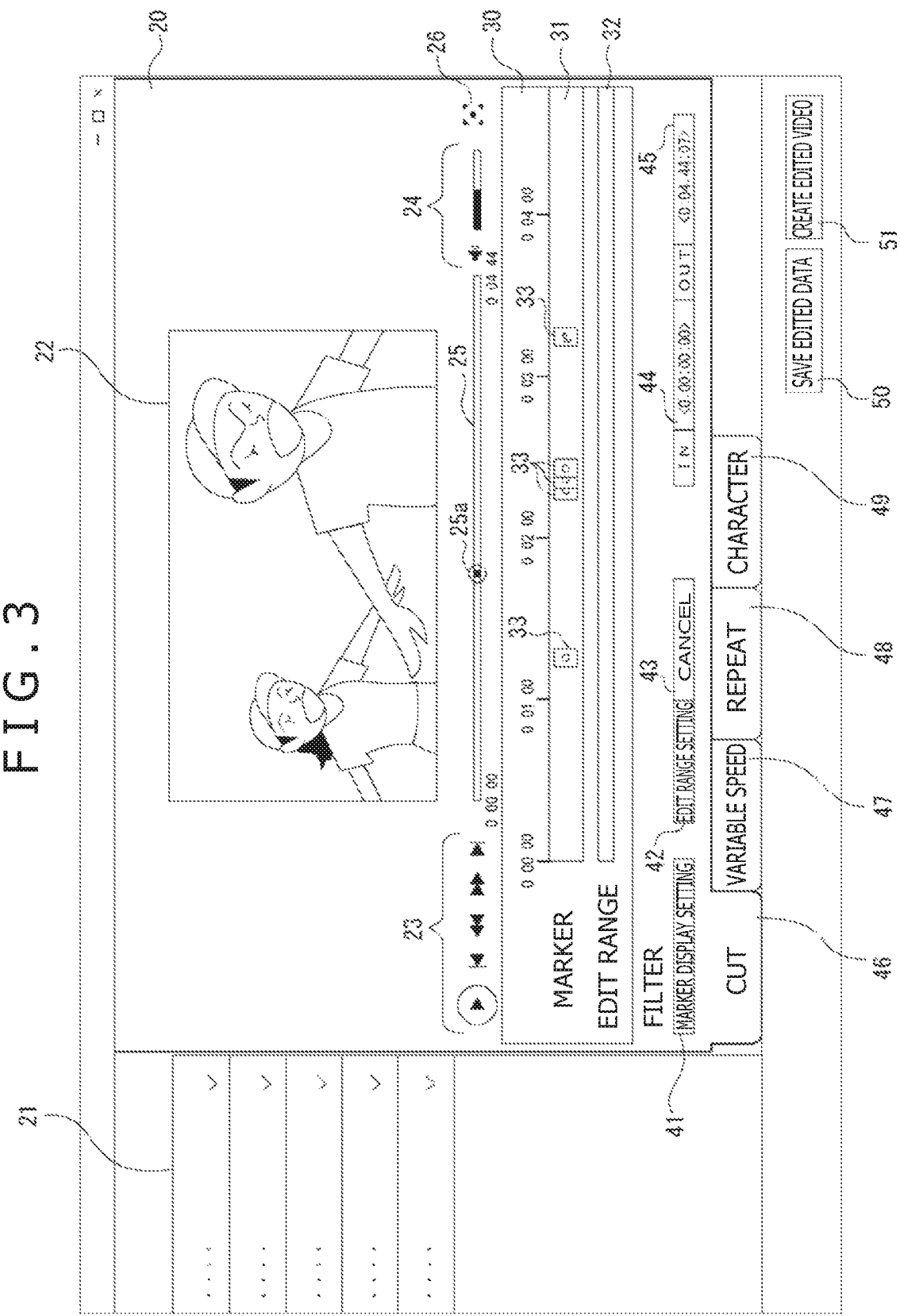
FIG. 3 is an explanatory view of an edit screen according to the embodiment.

FIG. 3 depicts an example of an edit screen 20 displayed on, for example, the display unit 13 of FIG. 1.

A menu area 21 depicting a menu for reading various edit functions and a video area 22 for displaying content of the actual video are prepared in the edit screen 20.

For example, in response to an operation by the user for designating video data stored in the storage unit 10 as an edit target, images of the video are reproduced in the video area 22 on the edit screen as in FIG. 3, or an image is displayed in a reproduction stop state.

On the edit screen 20, a reproduce button, a back button, a rewind button, a fast forward button, an advance button, and the like are displayed in a reproduction related operation section 23, for example. The user can operate (for example, click or touch) these operators to arbitrarily reproduce the designated video in the video area 22 or move to a desired scene.

Further, a mute button, a volume bar, and the like are displayed in a volume operation section 24. The user can operate these operators to turn on or off the voice output during the reproduction or instruct volume adjustment.

Further, a full screen mode, a reduced screen mode, and the like of the edit screen 20 on the display can be selected in a screen mode operation section 26.

In a video bar 25, the entire bar indicates the scale (time length) of the target video data, and the position of the scene currently displayed in the video area 22 is presented by a video pointer 25a. In the example, the length of the video data to be edited is 4 minutes and 44 seconds, and accordingly, the entire video bar 25 expresses 0 minutes and 0 seconds to 4 minutes and 44 seconds.

An edit range presentation area 30 is provided in the edit screen 20.

A marker bar 31 and an edit range bar 32 are vertically lined up and displayed in the edit range presentation area 30. As for the total length of the marker bar 31 and the edit range bar 32, the length of the entire bar also expresses the time length (for example, 4 minutes and 44 seconds in this case) of the target video data as in the video bar 25.

Marker images 33 are displayed on the marker bar 31. More specifically, the images are presented according to the kinds of respective markers to allow recognizing the added positions on the time axis where various types of metadata (such as a face detection marker, a highlight marker, and a cheer marker) actually added to the video data.

Therefore, the marker images 33 on the marker bar 31 allow the user to roughly figure out where and which markers are added to the video data, the types of markers added, the number of markers, and the like.

Although not displayed in FIG. 3, edit ranges according to the markers are displayed on the edit range bar 32 as described later. The edit ranges are ranges of the video to be edited. Specifically, the edit ranges are parts of the video to be used as edited video data, and for example, a plurality of set edit ranges are connected to generate the edited video data. In that sense, the edit ranges denote ranges to be cut out from the original video data.

A marker display setting button 41, an edit range setting button 42, and a cancel button 43 are displayed on the edit screen 20, and the user can operate the buttons.

The marker display setting button 41 is an operator for selecting the marker image 33 to be displayed on the marker bar 31.

The edit range setting button 42 is an operator for instructing to set the edit range according to the marker, and the cancel button 43 is an operator for canceling the operation (edit range setting according to the operation).

An in-point presentation section 44 and an out-point presentation section 45 are provided on the edit screen 20, and respective time codes of an in-point and an out-point are displayed. For example, when an edit range is designated, the in-point and the out-point of the edit range are presented.

The display screen of FIG. 3 depicts an image example on a cut tab 46. This is a tab for setting the edit ranges according to the markers.

In addition, a variable speed tab 47, a repeat tab 48, a character tab 49, and the like are prepared. Although not illustrated, when the variable speed tab 47 is selected, a screen for performing an operation for designating variable speed reproduction (slow or high-speed reproduction) of an edit range or an operation for instructing an image effect and the like is displayed.

When the repeat tab 48 is selected, a screen for performing repeat reproduction, an operation for designating the number of repetitions, and the like for an edit range is displayed.

When the character tab 49 is selected, a screen for performing an input operation of a text to be added to an edit range, such as a text to be superimposed, is displayed.

An edited data saving button 50 and an edited video creating button 51 are prepared outside of the tab area in the edit screen 20.

The edited data saving button 50 is an operator for the user to store edited data. The edited data includes, for example, the set edit ranges, the information of the reproduction mode such as variable speed and repeating that are set for each edit range, the text information, the information of the changed edit ranges, and the selection information of the markers. Therefore, the edited data is information of the edit ranges set according to the markers and the editing work of the edit ranges set or changed by the operation of the user and is information as a source for creating edited video data at the moment.

The edited video creating button 51 is an operator for instructing to generate and output edited video data based on the edited data at the moment.

In response to the operation of the edited video creating button 51, the image processing apparatus 1 connects the edit ranges, adds effects to the respective edit ranges, changes the speed, repeats the video, or superimposes characters based on the edited data at the time to thereby generate, for example, stream data as edited video data. The image processing apparatus 1 stores the edited video data in the storage unit 10 or causes the communication unit 11 to transmit the edited video data to an external device.

Figure 4:
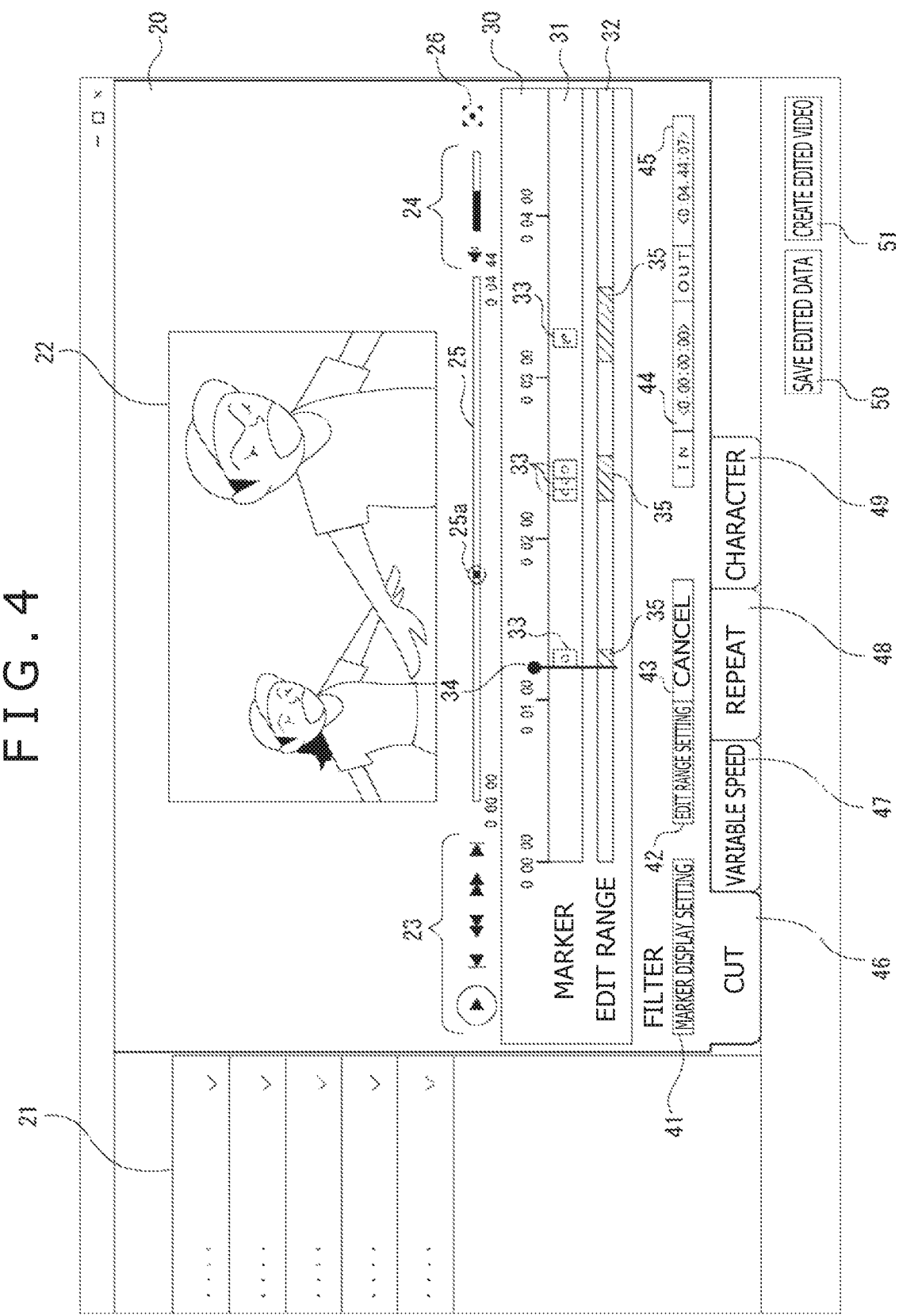
FIG. 4 is an explanatory view of an edit range display state of the edit screen according to the embodiment.

When the edit range setting button 42 is operated in the state of the edit screen 20 of FIG. 3, the edit ranges are automatically set according to all or part of the markers, and the set edit ranges are presented in a display state as depicted in FIG. 4.

In FIG. 4, range images 35 indicating the edit ranges set according to the respective markers 33 are displayed on the edit range bar 32. Although the range images 35 are indicated by shaded areas on the edit range bar 32 in FIG. 4, the range images 35 can be actually displayed as parts with a different color. Although the respective range images 35 may be displayed in a common mode (for example, color and design), the range images 35 may be displayed in a mode such that the range images 35 are distinguished according to the kinds of corresponding markers 33.

Here, the setting of the edit ranges according to the markers and the presentation of the setting will be described. As described above, the markers include various markers serving as the first additional information and various markers serving as the second additional information.

In the present embodiment, the edit range corresponding to the marker is set according to whether the marker is the first additional information for designating a specific point in time on the time axis of the video or the second additional information for designating a specific time range on the time axis of the video.

Specifically, the marker of the first additional information indicates a specific point in time, and the edit range is set based on the specific point in time. The marker of the second additional information indicates a specific time range, and the edit range is set based on the start point and the end point of the time range.

More specifically, when the marker is the first additional information, a range from a point in time that is a first set time period before the specific point in time to a point in time that is a second set time period after the specific point in time is set as the edit range.

When the marker is the second additional information, a range from a point in time that is a third set time period before the start point of the time range to a point in time that is a fourth set time period after the end point of the time range is set as the edit range.

Here, the time lengths of the first set time period, the second set time period, the third set time period, and the fourth set time period each may be the same or may be different. First, examples of setting the edit range will be described by assuming that all of the first to fourth set time periods are two seconds.

FIG. 5A depicts each part of the marker bar 31 and the edit range bar 32, and it is assumed that a marker image 33A in the marker bar 31 is, for example, an image corresponding to a face detection marker that is the first additional information. It is assumed that the face detection marker is information marking a time code "0:01:00:00" (0 hours, 1 minute, 0 seconds, and 0 frames) in the video data.

It should be noted that, although the time code usually indicates hours, minutes, seconds, and frames, the frames are often not indicated on the actual screens and the like to avoid complication. For example, the frames are not displayed on the edit screen 20 in the example of FIGS. 3 and 4.

Figure 5:
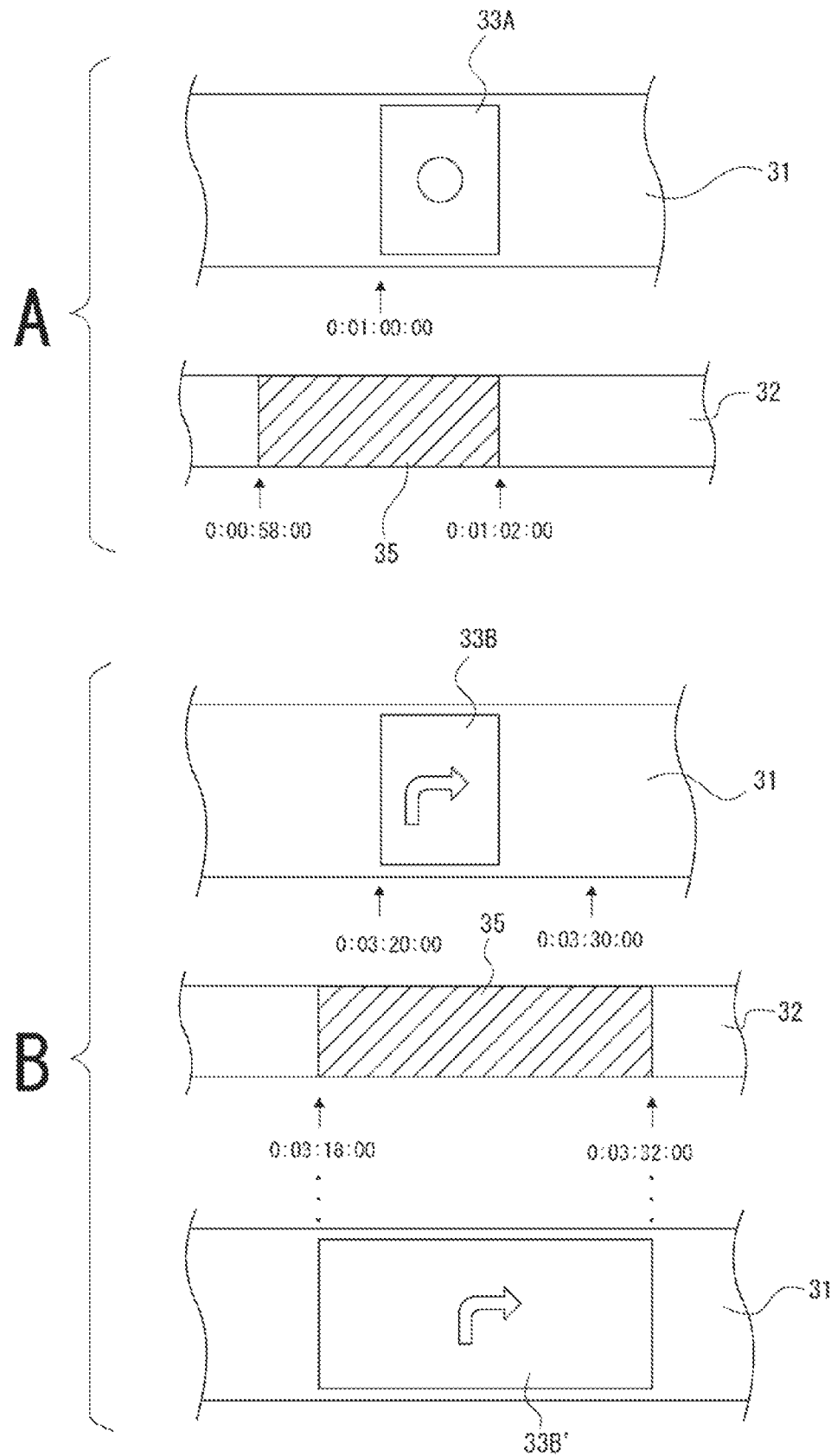
FIG. 5 is an explanatory view of edit ranges set and presented in the embodiment.
Figure 6:
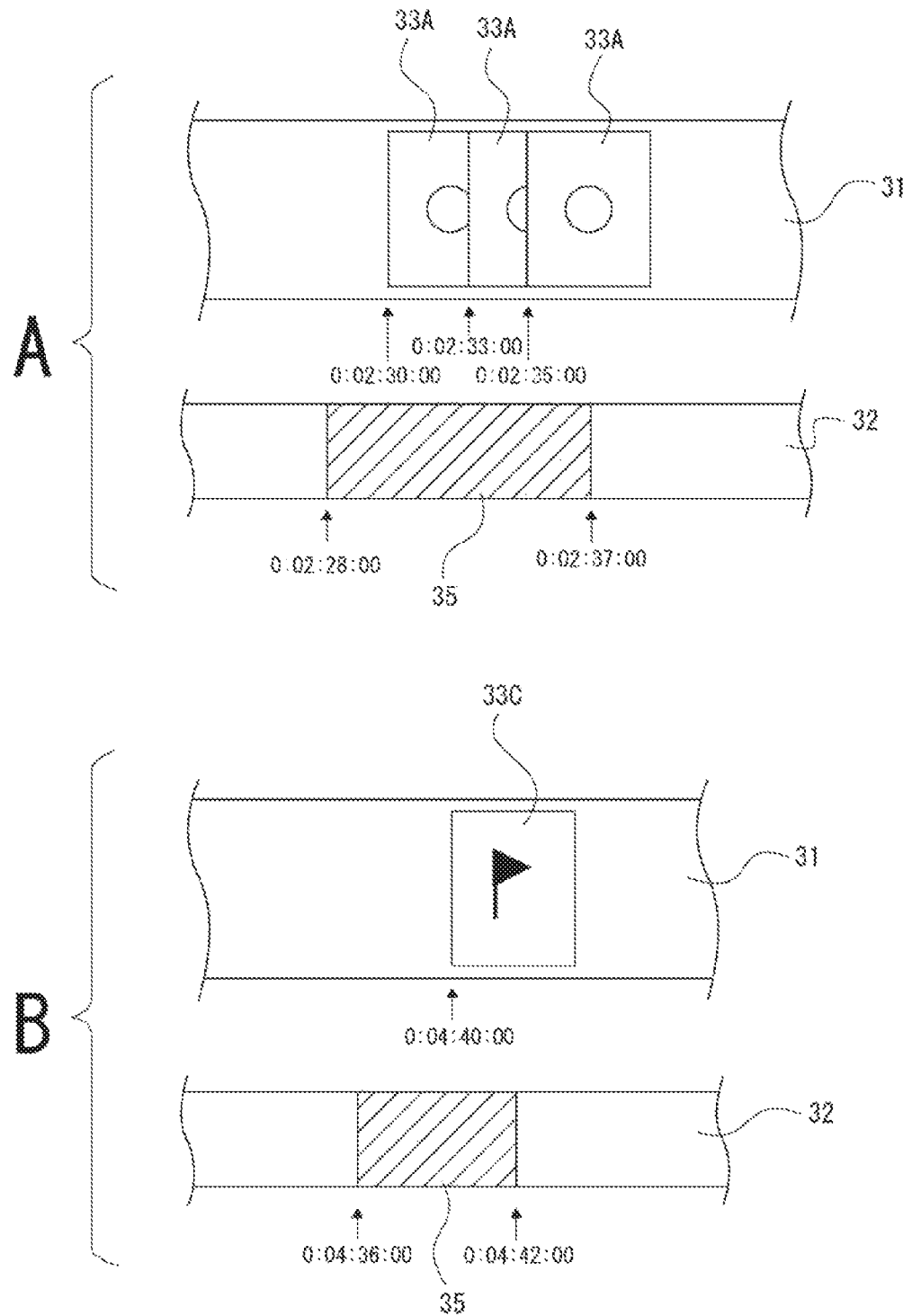
FIG. 6 is an explanatory view of edit ranges set and presented in the embodiment.

Furthermore, the time codes depicted in FIGS. 5 and 6 are not actually displayed, and the time codes are indicated for the description. However, the time codes may be actually displayed.

The marker image 33A is displayed at the position of the time code "0:01:00:00" in the marker bar 31 according to the face detection marker.

Note that the marker image 33 is an image with some area to increase the recognizability of the marker image 33 (such as 33A) for the user. Therefore, one side (left side) of the marker image 33A is displayed at the position of "0:01:00:00" as in FIG. 5A. However, this is just an example. For example, the right side may be at the position corresponding to the time code, or the center in the left and right direction may be at the position corresponding to the time code.

The marker image 33A (such as 33A) is an image with some area instead of a simple line or the like corresponding to the time code, and different images are displayed according to the kinds of markers. This allows the user to more easily recognize what kinds of markers are provided.

For the marker, the edit range is set as described above. In the case of FIG. 5A, assuming that the first set time period=the second set time period=2 seconds is set, the edit range is set to a range of time codes "0:00:58:00" to "0:01:02:00."

To indicate the edit range set in this way, the range image 35 is displayed at the part of "0:00:58:00" to "0:01:02:00" on the edit range bar 32 as depicted in FIG. 5A. This allows the user to recognize the edit range set according to a face detection marker (marker image 33A), such as a range cut from the original video data.

Next, an upper section and a middle section of FIG. 5B depict each part of the marker bar 31 and the edit range bar 32, and it is assumed that a marker image 33B in the marker bar 31 is, for example, an image corresponding to a cheer marker that is the second additional information. The cheer detection marker is information marking a period of time codes "0:03:20:00" to "0:03:30:00" in the video data.

The marker image 33B is displayed at the position of the time code "0:03:20:00" in the marker bar 31 according to the cheer marker, that is, the start point is set as a representative point in time to display the left side of the marker image 33B at the start point. Obviously, this is just an example. For example, the end point of the period can be set as a representative point in time, and the right side of the marker image 33B can be displayed at the end point. The center of the period can be set as a representative point in time, and the center of the marker image 33B in the left and right direction can be displayed to coincide with the time code position. Such a display is also suitable.

For the marker, the edit range is set as described above. In the case of FIG. 5B, assuming that the third set time period=the fourth set time period=2 seconds is set, the edit range is set to a range of time codes "0:03:18:00" to "0:03:32:00."

To indicate the edit range set in this way, the range image 35 is displayed at the part of "0:03:18:00" to "0:03:32:00" on the edit range bar 32 as depicted in FIG. 5B. This allows the user to recognize the edit range set according to a cheer marker (marker image 33B), such as a range cut from the original video data.

Note that a lower section of FIG. 5B depicts a marker image 33B' as another display example of the marker image 33B. The example is an example in which the range of the marker image 33B in the left and right direction coincides with the edit range. This allows the marker image 33B as the second additional information and the edit range corresponding to the marker image 33B to be easily understood. However, the display may complicate the marker bar 31, and the recognizability for the user may be reduced. When this is considered, the display as in the upper section of FIG. 5B is desirable.

FIG. 6A depicts a case in which a plurality of markers as first additional information exist at close positions on the time axis. For example, it is assumed that three face detection markers each designate "0:02:30:00," "0:02:33:00," and "0:02:35:00."

Accordingly, three marker images 33A indicating the face detection markers are displayed to overlap with each other on the marker bar 31.

Assuming that the first set time period=the second set time period=2 seconds is set, the edit ranges of the face detection markers are each "0:02:28:00" to "0:02:32:00," "0:02:31:00" to "0:02:35:00," and "0:02:33:00" to "0:02:37:00," and the previous and following edit ranges overlap with each other. Therefore, the edit ranges are integrated on the edit range bar 32, and "0:02:28:00" to "0:02:37:00" is set as the edit range to display the range image 35.

Incidentally, for example, the first set time period, the second set time period, the third set time period, and the fourth set time period may be fixed regardless of the kind of marker or may be changed according to the kind of marker.

For example, FIG. 6B illustrates a marker image 33C corresponding to a highlight marker and the range image 35 indicating the edit range according to the marker image 33C. The highlight marker is information indicating "0:04:40:00."

This is an example in which although the first set time period=the second set time period=2 seconds is set as in FIG. 5A, for example, the first set time period is changed for a specific marker. Here, the setting is changed to the first set time period=4 seconds in a case of a highlight marker. Therefore, "0:04:36:00" to "0:04:42:00" is the edit range, and the edit range is displayed as in FIG. 5B.

As in the example, for example, for all or part of the first to fourth set time periods used to set the edit range, different values may be applied according to the kind of marker.

In summary, there can be a variety of specific examples of the first set time period, the second set time period, the third set time period, and the fourth set time period.

First, there is an example in which the first set time period=the second set time period=the third set time period=the fourth set time period is set as described above. The set time periods are used regardless of the kind of marker to set the edit ranges.

The first set time period≠the second set time period≠the third set time period≠the fourth set time period may be set and fixed regardless of the kind of marker. For example, the first set time period=3 seconds, the second set time period=2 seconds, the third set time period=2.5 seconds, and the fourth set time period=1.5 seconds are set.

The first set time period=the third set time period=x seconds and the second set time period=the fourth set time period=y seconds may also be set.

The first set time period=the second set time period=the fourth set time period=x seconds and the second set time period=y seconds may also be set.

The first set time period=the second set time period=the fourth set time period=x seconds and the third set time period=y seconds may also be set.

The second set time period=the third set time period=the fourth set time period=x seconds and the first set time period=y seconds may also be set.

Further, when the setting is changed according to the kind of marker, all of the first set time period, the second set time period, the third set time period, and the fourth set time period may be changed in the case of a specific kind of marker, or part of them may be changed.

Furthermore, unique first set time period and second set time period can be determined for each kind of marker serving as the first additional information, and further, unique third set time period and fourth set time period can be determined for each kind of marker serving as the second additional information.

Next, arbitrary editing of the edit range will be described with reference again to FIG. 4.

FIG. 4 depicts an example of displaying an edit pointer 34 across the marker bar 31 and the edit range bar 32.

The edit pointer 34 indicates a specific time code. The user can operate and move the edit pointer 34 to an arbitrary position to set the position (or corresponding edit range) as a target of the edit operation.

For example, when the user performs an operation of setting the edit pointer 34 to a range image 35 or a marker image 33, the image processing apparatus 1 recognizes that the edit range or the marker designated by the edit pointer 34 is the target of the edit operation and executes a necessary process. For example, the in-point presentation section 44 and the out-point presentation section 45 display the in-point and the out-point of the edit range, and an image of the time code is displayed in the video area 22. Furthermore, a process corresponding to a subsequent user operation is executed. For example, when the edit pointer 34 is moved while an edit range is designated by the edit pointer 34, the image processing apparatus 1 recognizes that the edit range is changed and executes an editing process.

For example, the user can perform an operation of setting the edit pointer 34 to an edge of a range image 35 and moving the edit pointer 34 to the left or the right to thereby change the start point or the end point of the set edit range to extend or reduce the edit range.

The user can also perform an operation of variable speed designation, repeat designation, effect designation, character input, or the like for the edit range designated by the edit pointer 34.

The user can also delete the marker designated by the edit pointer 34 or add a marker to a position designated by the edit pointer 34.

Therefore, the edit pointer 34 is used for designation of the marker image 33, designation of the range image 35, designation of an arbitrary time code position, and the like when the user intends to arbitrarily perform the edit operation.

Next, display setting of the markers will be described.

The user can select the kinds of markers to be displayed on the marker bar 31. For example, when the user operates the marker display setting button 41, the image processing apparatus 1 displays a display setting window 61 depicted in FIG. 7. A marker selection area 62, a video presentation section 64, a close button 63, and the like are provided in the display setting window 61.

A list of the kinds of markers added to the video data to be processed is depicted in the marker selection area 62, and a check box is provided to each kind of marker. The user can view the marker selection area 62 to recognize the kinds of markers added to the video data as a current processing target.

Figure 7:
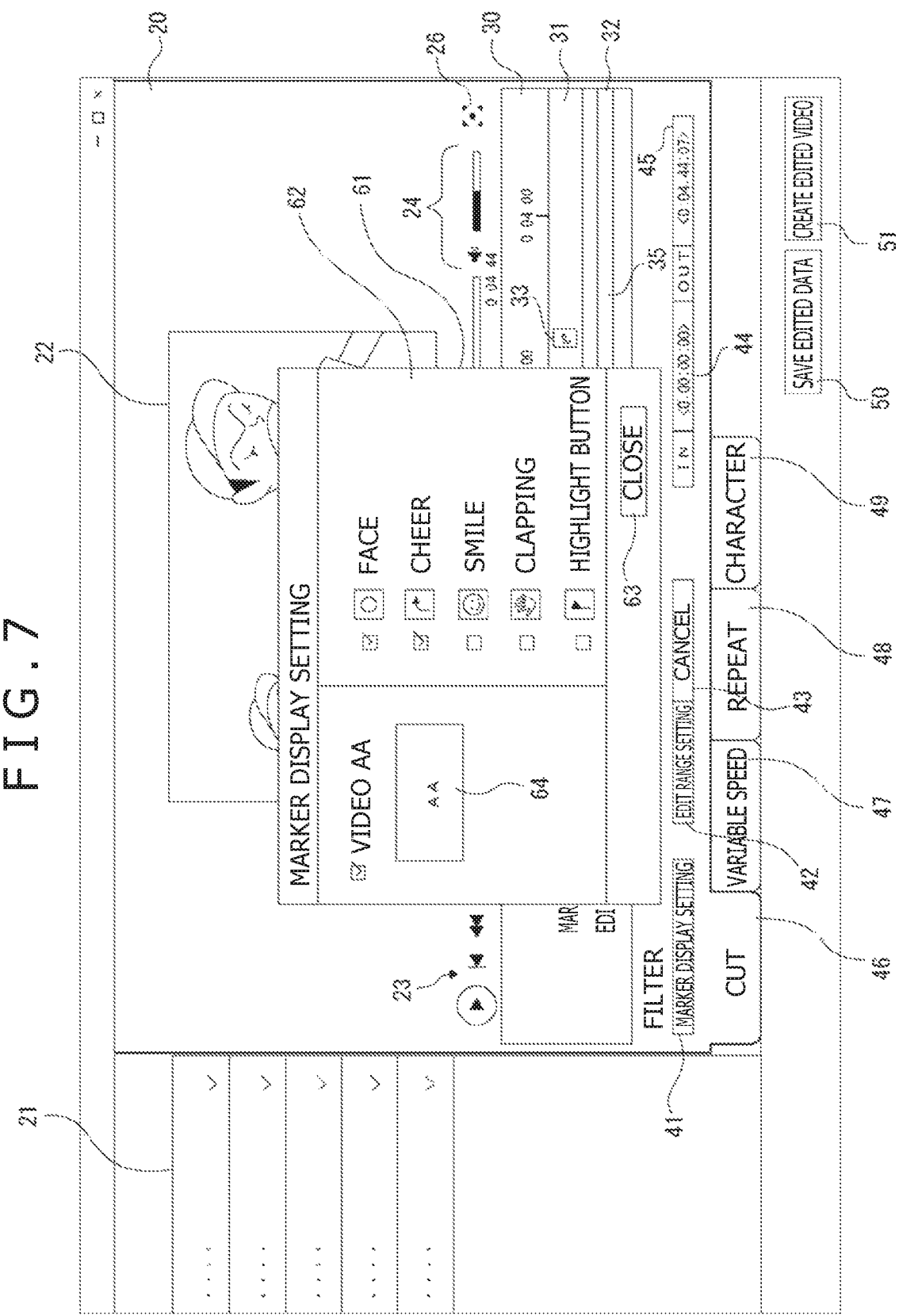
FIG. 7 is an explanatory view of a marker display setting window according to the embodiment.

The user then uses the check boxes displayed for the kinds of markers to select kinds of markers to be displayed on the marker bar 31. When the face detection marker and the cheer marker are checked as depicted in FIG. 7, the marker images 33 corresponding to the face detection marker and the cheer marker are displayed as in FIG. 4. The display of the marker images 33 on the marker bar 31 indicates that the edit ranges of the markers of the kinds can be set or arbitrarily edited.

For example, when the user intends to collect scenes including persons and scenes with cheers from video data of an athletic meet or the like to create edited video data as a digest video, the user can select the face detection marker and the cheer marker to display the markers on the marker bar 31. The edit ranges can be set for the markers, and the range images 35 can be displayed on the edit range bar 32.

Furthermore, markers not originally provided to the video data can be added, and the markers can also be deleted.

Figure 8:
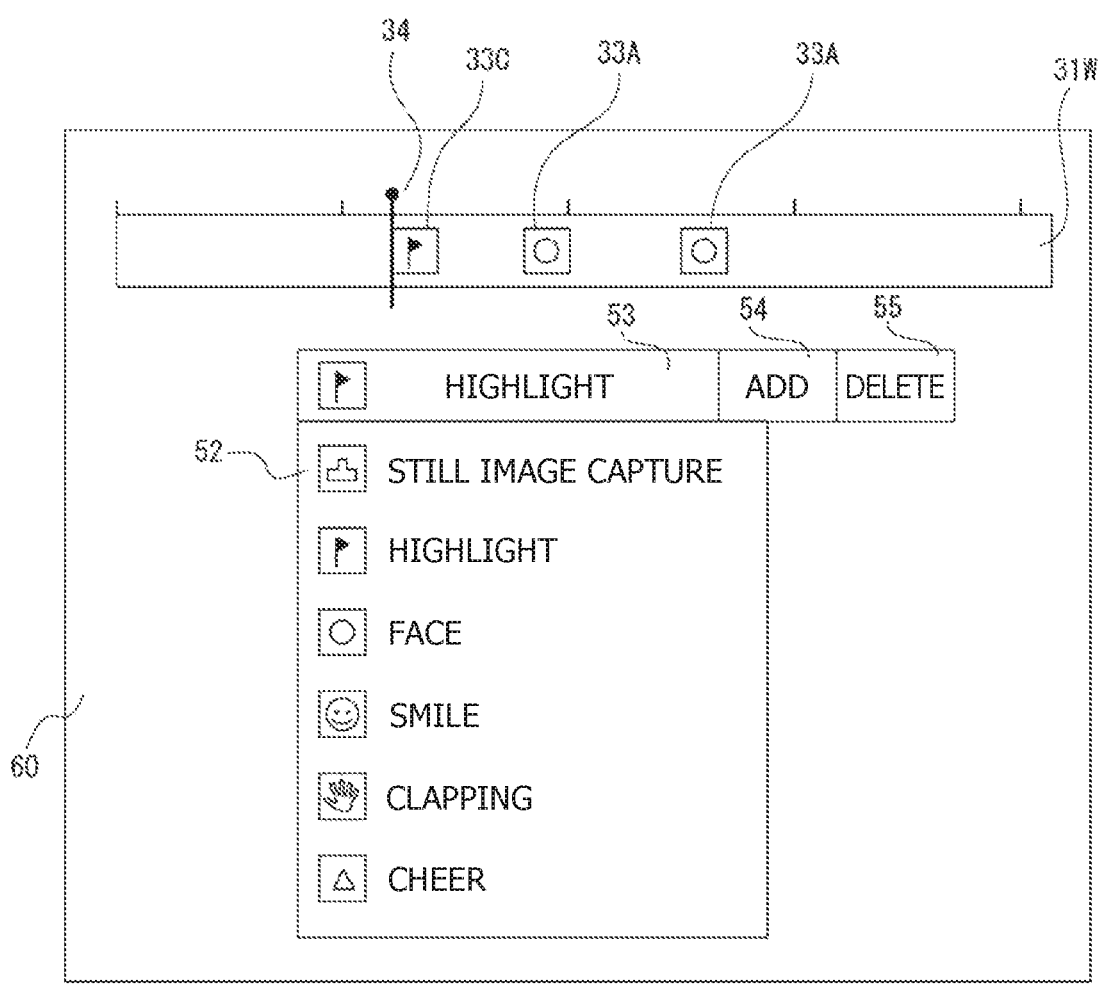
FIG. 8 is an explanatory view of a marker adding and deleting window according to the embodiment.

When the user performs a predetermined operation for adding or deleting a marker, the image processing apparatus 1 displays a window 60 as in FIG. 8. The window 60 displays a marker bar 31W, a marker list section 52, a selected marker presentation section 53, an add button 54, a delete button 55, and the like.

The marker images 33A currently displayed on the marker bar 31 of the edit screen 20 and the added marker image 33C are displayed on the marker bar 31W.

For example, the user arranges the edit pointer 34 on an arbitrary position on the marker bar 31W. The user then selects an arbitrary marker from the marker list section 52. In response to the operation, the image processing apparatus 1 indicates the selected marker (highlight marker in this example) in the selected marker presentation section 53 and displays the marker image 33C of the selected highlight marker at the position of the edit pointer 34 on the marker bar 31W.

When the user operates the add button 54, the image processing apparatus 1 sets this state, that is, the state in which the highlight marker is added to the time code position indicated by the edit pointer 34, and returns to the edit screen 20 of FIG. 4 or the like. In this case, the marker image 33C of the highlight marker is added to the marker bar 31.

For example, the user can designate an arbitrary time code position in this way to add an arbitrary marker.

Conversely, an already added marker (marker image 33) can also be designated by the edit pointer 34 to operate the delete button 55 to delete the marker. It should be noted that the "deletion" here may be a process of deleting the marker as the metadata from the original video data or may be deletion meaning simple removal of the marker from the setting target of the edit range.

The user can use the edit screen 20 to perform various types of editing work for the target video data. In the editing work, the following points are convenient for the user.

The markers added to the target video data are displayed by the marker images 33 according to the time codes, and the user can recognize the positions and the types of the markers.

The edit ranges are automatically set according to the markers. In this case, respective appropriate ranges are set as the edit ranges according to the first additional information or the second additional information.

The user can arbitrarily select the kinds of markers for setting the edit ranges.

The user can arbitrarily add and delete specific kinds of markers serving as markers for setting the edit ranges.

The user can arbitrarily change the start point and the end point of each edit range set according to the marker.

For each edit range, the user can arbitrarily designate a reproduction mode, set an effect, or set a character.

Through a reproduction operation, the edit range being edited can be reproduced, and an edited video connecting the respective edit ranges can be checked.

After the editing work, the edited data can be saved, and creation and output of the edited video can be instructed.

4. Process Example

A process example of the image processing apparatus 1 that displays the edit screen 20 to provide an editing work environment to the user will be described. For example, the image processing apparatus 1 executes a process described below through functions of the target recognition unit 2, the edit processing unit 3, and the output processing unit 4 of FIG. 1. Specifically, the image processing apparatus 1 is an information processing apparatus as in FIG. 2 and executes the following process when a program for edit is started.

Figure 9:
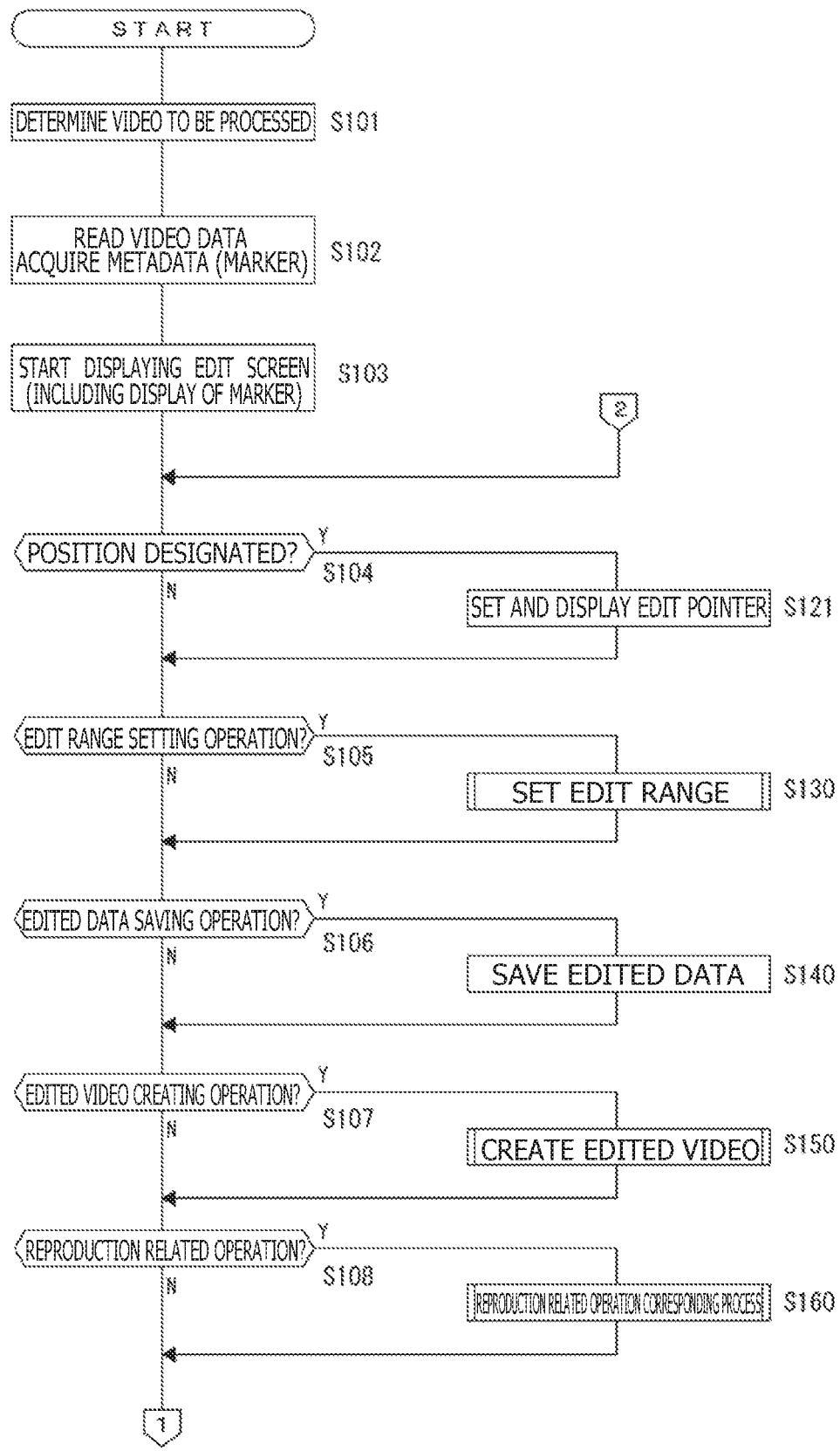
FIG. 9 is a flow chart of a video editing process according to the embodiment.
Figure 10:
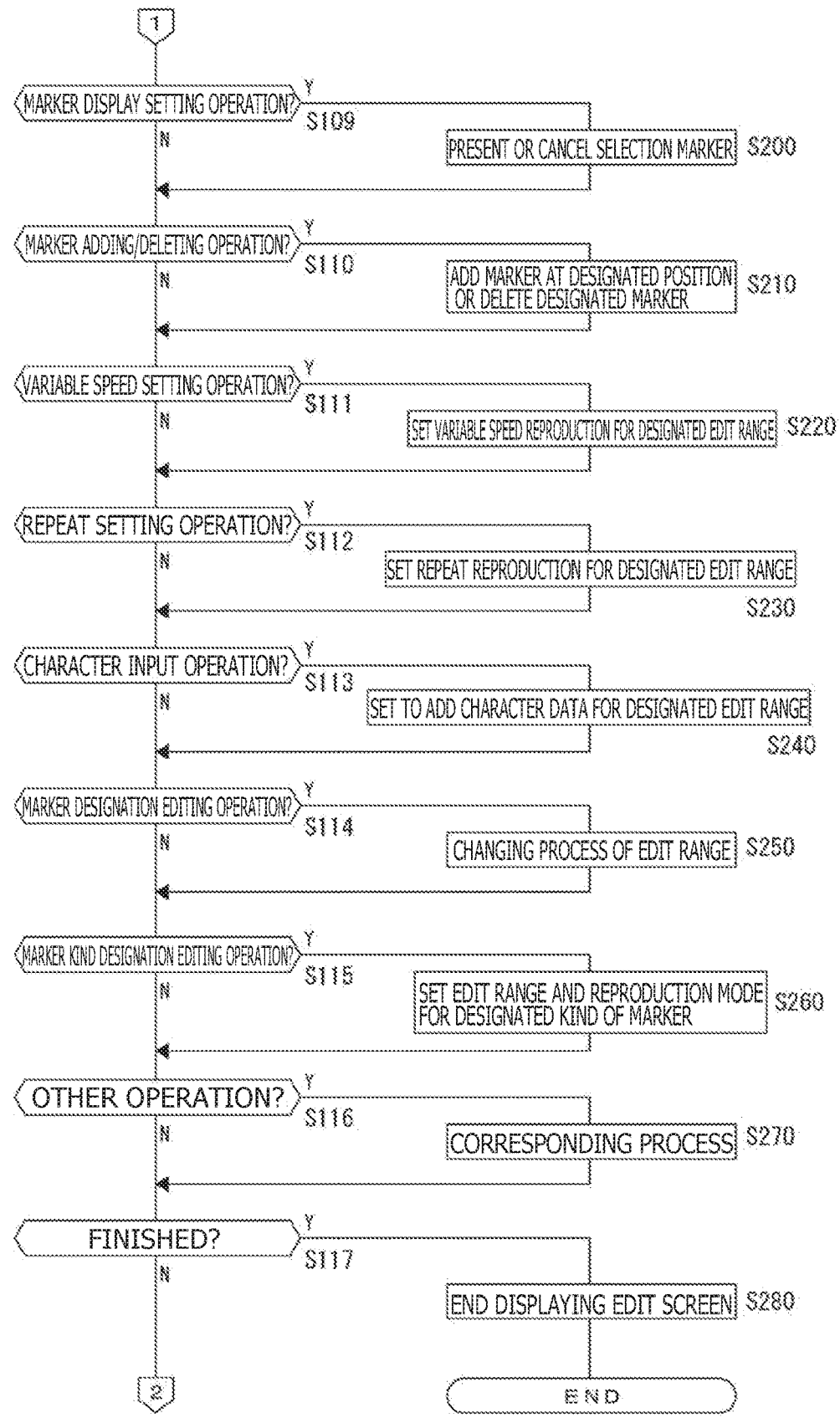
FIG. 10 is a flow chart of the video editing process according to the embodiment.

FIGS. 9 and 10 depict an example of a process executed by the image processing apparatus 1.

The image processing apparatus 1 determines a video to be processed in step S101 of FIG. 9. More specifically, the image processing apparatus 1 determines one piece of video data stored in the storage unit 10 as video data to be edited according to an operation by the user.

In step S102, the image processing apparatus 1 reads the video data determined to be processed from the storage unit 10 and acquires metadata (markers) added to the video data.

In step S103, the image processing apparatus 1 starts to display the edit screen 20. More specifically, the image processing apparatus 1 sets the state for displaying the target video data in the video area 22 and displays the marker images 33 corresponding to the markers added to the video data on the marker bar 31. For example, the image processing apparatus 1 causes the display unit 13 to execute the display in the state of FIG. 3. The display of the marker images 33 is in the display mode as described in FIG. 5.

Note that the kinds of markers for displaying the marker images 33 in the initial state may be fixed and set in advance or may be set by the user. Alternatively, the marker images 33 may be displayed for all markers added to the video data. Furthermore, the marker images 33 may not be displayed until the user performs the selection operation described in FIG. 7.

After starting the display of the edit screen 20, the image processing apparatus 1 monitors the user operation and executes a process according to the detected operation. In FIGS. 9 and 10, the detected user operations include a time code position designation operation (S104), an edit range setting operation (S105), an edited data saving operation (S106), an edited video creating operation (S107), a reproduction related operation (S108), a marker display setting operation (S109), a marker adding/deleting operation (S110), a variable speed setting operation (S111), a repeat setting operation (S112), a character input operation (S113), a marker designation edit operation (S114), and a marker kind designation edit operation (S115). Although there are other user operations to be monitored, the user operations are referred to as "other operations" (S116).

The image processing apparatus 1 repeats the monitoring process of steps S104 to S116 until it is determined that the image editing process is finished in step S117.

When the time code position designation operation by the user is detected, the image processing apparatus 1 proceeds from step S104 to S121. The time code position designation operation is an operation of arranging the edit pointer 34 on a time code.

In response to the operation, the image processing apparatus 1 executes a process of changing the position of the edit pointer 34 on the screen to the position designated by the operation in step S121.

When the edit range setting operation by the user is detected, the image processing apparatus 1 proceeds from step S105 to S130 and executes an edit range setting process. The edit range setting operation is, for example, an operation of the edit range setting button 42 on the edit screen 20. In response to the operation, the image processing apparatus 1 sets the edit ranges according to all or part of the markers for which the marker images 33 are displayed on the marker bar 31.

For example, in response to the operation of the edit range setting button 42, the image processing apparatus 1 automatically sets the edit ranges for all of the markers for which the marker images 33 are displayed.

Alternatively, in response to the operation of the edit range setting button 42, the image processing apparatus 1 may set the edit ranges for the markers of the marker images 33 designated by the edit pointer 34 or the like at the time.

Alternatively, in response to the operation of the edit range setting button 42, the image processing apparatus 1 may set the edit ranges for all of the markers of the same type as the type of the marker of the marker image 33 designated by the edit pointer 34 or the like at the time. For example, when one face detection marker is designated by the edit pointer 34, the image processing apparatus 1 sets the edit ranges for all of the face detection markers for each one.

Figure 12:
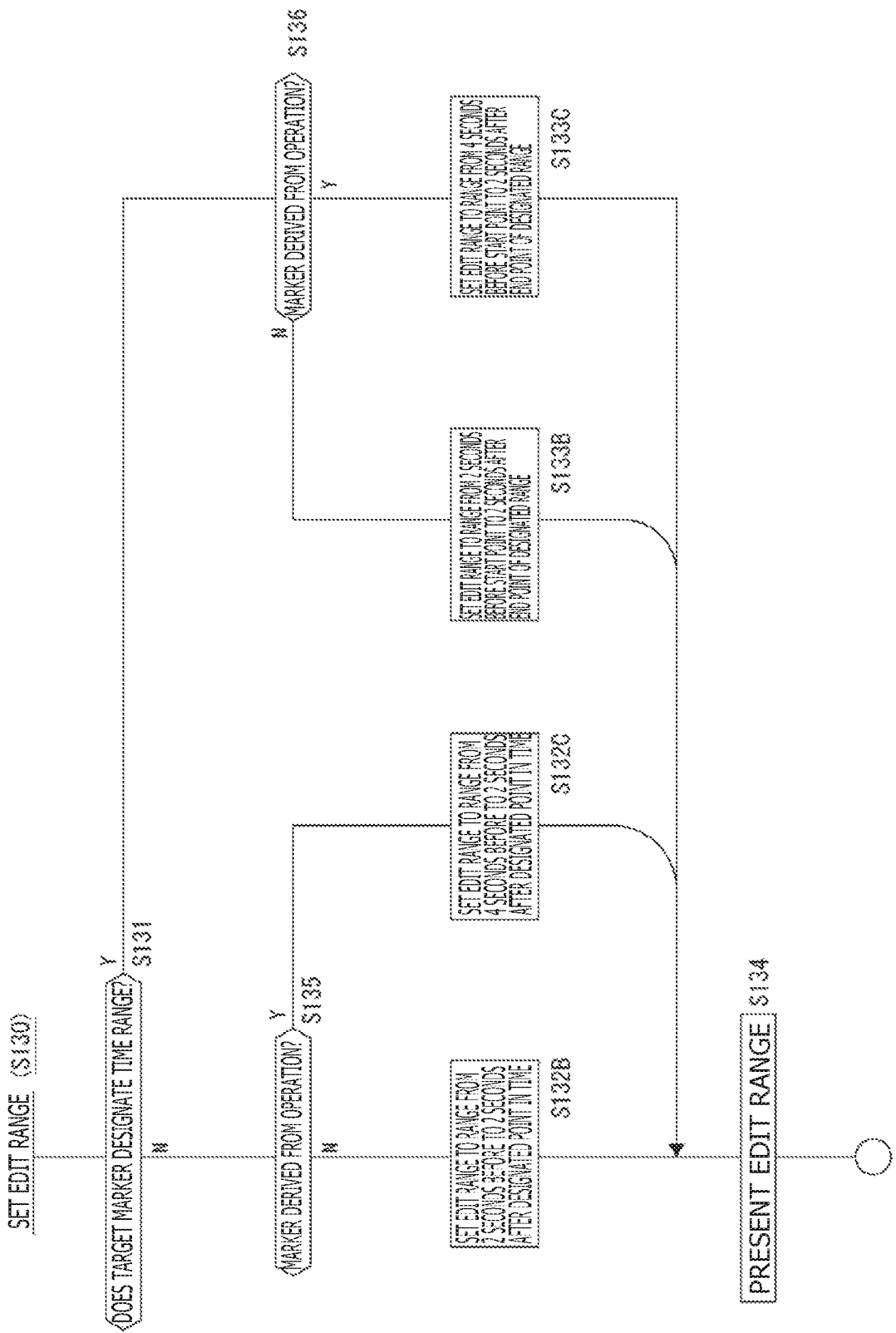
FIG. 12 is a flow chart of the edit range setting process according to the embodiment.

In any of the cases, examples of the edit range setting process for one marker can include examples as in FIGS. 11A, 11B, and 12.

When a plurality of markers are the targets of the edit range setting process, such as when the edit ranges are set for all of the markers, the process as in the following FIGS. 11A, 11B, and 12 can be repeated for each of the target markers.

First, an example of FIG. 11A will be described. FIG. 11A is an example in which the first set time period=the second set time period=the third set time period=the fourth set time period=2 seconds is set.

In step S131, the image processing apparatus 1 determines whether the target marker is a marker for designating the time range, that is, whether the marker is the second additional information. More specifically, the image processing apparatus 1 checks the kind of the marker to be processed and determines that the marker is the first additional information if the kind is a face detection marker, a still image recording marker, a highlight marker, or the like. On the other hand, the image processing apparatus 1 determines that the marker is the second additional information for designating the time range if the marker is a cheer marker, a clapping marker, a motion pattern marker or the like.

When the target marker is the first additional information, the image processing apparatus 1 sets the edit range to a range from two seconds before (first set time period) the point in time (time code) designated by the marker to two seconds after (second set time period) the point in time in step S132.

When the target marker is the second additional information, the image processing apparatus 1 sets the edit range to a range from two seconds before (third set time period) the time code of the start point of the time range designated by the marker to two seconds after (fourth set time period) the time code of the end point in step S133.

The image processing apparatus 1 then performs control to present the range image 35 of the set edit range to the user in step S134.

FIG. 11B is an example in which the first set time period=2.5 seconds, the second set time period=2 seconds, the third set time period=1.5 seconds, and the fourth set time period=1.8 seconds are set.

The image processing apparatus 1 determines the kind of the target marker in step S131 as in FIG. 11A.

When the target marker is the first additional information, the image processing apparatus 1 sets the edit range to a range from 2.5 seconds before (first set time period) the point in time (time code) designated by the marker to 2 seconds after (second set time period) the point in time in step S132A.

When the target marker is the second additional information, the image processing apparatus 1 sets the edit range to a range from 1.5 seconds before (third set time period) the time code of the start point of the time range designated by the marker to 1.8 seconds after (fourth set time period) the time code of the end point in step S133A.

The image processing apparatus 1 then performs control to present the range image 35 of the set edit range to the user in step S134.

An example of FIG. 12 is an example in which the first and third set time periods are changed according to the kind of marker. Although the first set time period=the second set time period=the third set time period=the fourth set time period=2 seconds is usually set, the setting is changed to the first set time period=the third set time period=4 seconds for a specific marker in the example.

The image processing apparatus 1 determines the kind of the target marker in step S131 as in FIG. 11A.

When the target marker is the first additional information, the image processing apparatus 1 determines whether the marker is a marker derived from operation in step S135. The marker derived from operation is a marker associated with the location of the operation timing according to the operation by the user performed during the video shooting. Specifically, the marker derived from operation is, for example, a highlight marker or a still image recording marker.

If the marker is not derived from operation, the image processing apparatus 1 proceeds to step S132B and sets the edit range to a range from 2 seconds before (first set time period) the point in time (time code) designated by the marker to 2 seconds after (second set time period) the point in time.

If the marker is derived from operation, the image processing apparatus 1 proceeds to step S132C and sets the edit range to a range from 4 seconds before (changed first set time period) the point in time (time code) designated by the marker to 2 seconds after (second set time period) the point in time.

When the target marker is the second additional information, the image processing apparatus 1 determines whether the marker is a marker derived from operation (for example, zoom marker) in step S136.

If the marker is not derived from operation, the image processing apparatus 1 proceeds to step S133B and sets the edit range to a range from 2 seconds before (third set time period) the time code of the start point of the time range designated by the marker to 2 seconds after (fourth set time period) the time code of the end point.

If the marker is derived from operation, the image processing apparatus 1 proceeds to step S133C and sets the edit range to a range from 4 seconds before (changed third set time period) the time code of the start point of the time range designated by the marker to 2 seconds after (fourth set time period) the time code of the end point.

The image processing apparatus 1 then performs control to display the range image 35 of the set edit range for the user in step S134.

In this way, the range included in the edit range is extended in a temporally past direction for the marker derived from operation. This is because when the point in time or the period is according to the operation by the user, the operation timing tends to be delayed from an optimal scene.

For example, the point in time of the highlight operation or the still image recording operation performed by the user thinking that the scene is important is often after the start of an important scene of an object. Therefore, an edit range a little longer in the past direction than the normal range is provided to allow cutting a suitable range of the important scene.

Note that when the set time period is to be changed in consideration of the circumstances, it is desirable to discriminate not only the kind of marker, but also the record attributes of the marker. For example, the highlight marker and the like can also be added according to the operation by the user during the reproduction or edit later, instead of during the shooting. During the reproduction or edit, the user can accurately check the start point of, for example, a highlight scene to perform an operation of adding the marker. Therefore, when the edit range is set longer in the past direction, the start point of the edit range may be too early. Accordingly, whether the marker is derived from operation and whether the marker is recorded during the shooting can be determined in step S135 or S136, and the process can proceed to step S132C or S133C in that case.

With reference again to FIG. 9, when the edited data saving operation by the user is detected, the image processing apparatus 1 proceeds from step S106 to S140 and executes an edited data saving process.

The edited data saving operation is, for example, an operation of the edited data saving button 50 in the edit screen 20. In response to the operation, the image processing apparatus 1 executes a process of saving the edited data (data regarding the editing work, such as edit range, marker selection state, and variable speed setting) at the time in, for example, the storage unit 10.

Saving the edited data allows the user to read the saved edited data later to recover the current work state.

When the edited video creating operation by the user is detected, the image processing apparatus 1 proceeds from step S107 to S150 and executes an edited video creating process. The edited video creating operation is, for example, an operation of the edited video creating button 51 in the edit screen 20.

Figure 13:
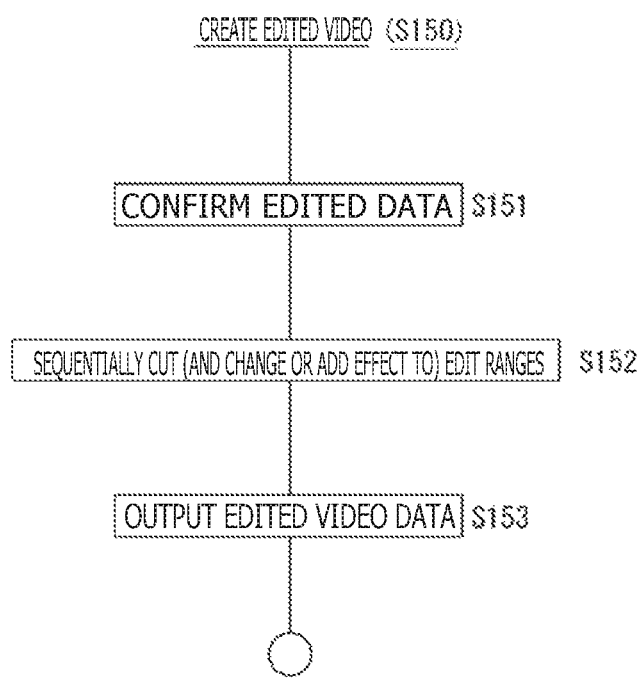
FIG. 13 is a flow chart of an edited video creating process according to the embodiment.

FIG. 13 depicts a process example of step S150.

In step S151, the image processing apparatus 1 confirms the edited data. More specifically, the image processing apparatus 1 determines that the edited data at the time is final work data for creating the edited video.

In step S152, the image processing apparatus 1 sequentially cuts and connects the respective edit ranges based on the edited data to generate video data as an editing result. In this case, when there are variable speed reproduction setting, repeat setting, effect setting, character input, and the like for the respective edit ranges, these are reflected to generate the video data.

In step S153, the image processing apparatus 1 outputs the edited video data. For example, the image processing apparatus 1 stores the edited video data in the storage unit 10. Alternatively, the image processing apparatus 1 transmits the edited video data to an external device through the communication unit 11.

With reference again to FIG. 9, when the reproduction related operation by the user is detected, the image processing apparatus 1 proceeds from step S108 to S160 and executes a reproduction related operation corresponding process. The reproduction related operation is an operation of the reproduction related operation section 23 or the volume operation section 24.

Figure 14:
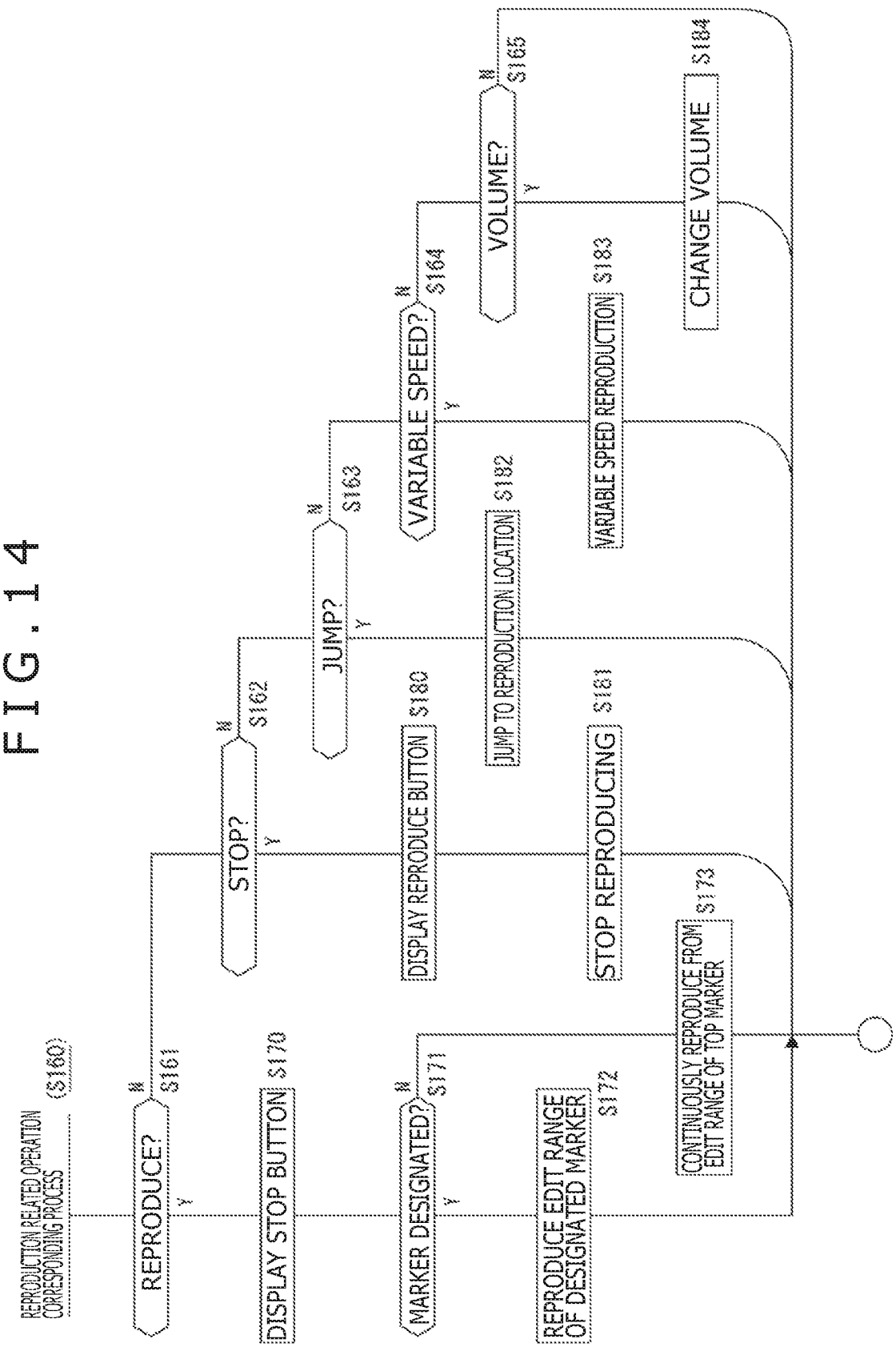
FIG. 14 is a flow chart of a reproduction related operation corresponding process according to the embodiment.

FIG. 14 depicts a process example of step S160.

The image processing apparatus 1 checks the details of the operation by the user in steps S161 to S165. When the user operates the reproduce button, the image processing apparatus 1 proceeds from step S161 to S170 and performs control to display a stop button first. For example, the image processing apparatus 1 changes the reproduce button as in FIG. 4 to the stop button and displays the stop button during the reproduction.

Next, in step S171, the image processing apparatus 1 determines whether a certain marker (edit range corresponding to the marker) is currently designated by the edit pointer 34.

If the marker is designated, the image processing apparatus 1 proceeds to step S172 and reproduces the video of the edit range of the designated marker. In this case, the image processing apparatus 1 may end the reproduction after reproducing one designated edit range once or may repeatedly reproduce the edit range.

Furthermore, even when the reproduction of the edit range is completed, the image processing apparatus 1 may continuously reproduce the original video from the end point.

If the specific marker is not designated, the image processing apparatus 1 proceeds to step S173 and reproduces the video by sequentially connecting the respective edit ranges from the edit range of the top marker. More specifically, the image processing apparatus 1 reproduces the video by connecting the parts that are cut as edit ranges. Therefore, the user can check the images of the edited video data.

When the reproduction up to the last edit range is finished, the reproduction may end, or the reproduction may be repeated again from the top edit range.

Note that when variable speed reproduction, the image effect, and the like are set for the edit range being reproduced, these may be reflected to reproduce the edit range in steps S172 and S173. Conversely, even when these are set, only the normal reproduction may be performed without reflecting the settings.

Further, when the edit pointer 34 particularly designates a time code without a marker, the original video can be reproduced from the designated time code regardless of the edit range.

When the user operates the stop button, the image processing apparatus 1 proceeds from step S162 to S180 and performs reproduce button display control. More specifically, the image processing apparatus 1 switches the display of the stop button during the reproduction to the display of the reproduce button as in FIG. 4. The image processing apparatus 1 then stops the reproduction operation in step S181.

It should be noted that, although the case of detecting the stop operation is illustrated here, steps S180 and S181 can also be executed when the reproduction advances to the end point position without operation by the user.

When the user operates a button regarding a jump operation, that is, the back button or the advance button, the image processing apparatus 1 proceeds from step S163 to S182 and executes a jumping process of the reproduction location. Therefore, the image processing apparatus 1 executes a process of changing the first location.

Note that if the video is not reproduced, the operation may be invalidated, or the location (position of stopped image) displayed in the video area 22 may be jumped.

When the user operates a button regarding variable speed operation, that is, the rewind button or the fast forward button, the image processing apparatus 1 proceeds from step S164 to S183 and executes a variable speed reproduction process. Therefore, the image processing apparatus 1 performs forward or rewind reproduction from the current reproducing position.

Note that if the video is not reproduced, the operation may be invalidated, or the location (position of stopped image) displayed in the video area 22 may be advanced or rewound.

When the user performs an operation regarding volume, the image processing apparatus 1 proceeds from step S165 to S184 and executes a process of changing the volume setting, muting, unmuting, or the like according to the operation.

The process according to the reproduction related operation allows the user to check the video in the process of editing work in the video display of the video area 22. Particularly, this is suitable for continuously reproducing the respective edit ranges to check the images of the edited video.

When the marker display setting operation by the user is detected, the image processing apparatus 1 proceeds from step S109 to S200 of FIG. 10 and executes a process of presenting a selection marker or canceling the presentation.

The marker display setting operation is an operation of the marker display setting button 41 of the edit screen 20.

In response to the operation, the image processing apparatus 1 displays the display setting window 61 described in FIG. 7. The image processing apparatus 1 then executes a process of determining the marker to be displayed according to the operation by the user for selecting the marker to be displayed. The image processing apparatus 1 then executes a process of displaying, on the marker bar 31, the marker determined to be displayed. The presentation of the marker that has been displayed, but for which the user has removed the check in the marker selection area 62, is canceled, and the marker is not displayed on the marker bar 31.

When the marker adding or deleting operation by the user is detected, the image processing apparatus 1 proceeds from step S110 to S210 of FIG. 10. The image processing apparatus 1 adds the marker at the designated position or deletes the designated marker.

In response to the marker adding or deleting operation, the image processing apparatus 1 displays the window 60 described in FIG. 8 and sets the addition or the deletion according to the user operation in the window 60 as described above.

When the variable speed setting operation by the user is detected, the image processing apparatus 1 proceeds from step S111 to S220 of FIG. 10 and sets the variable speed reproduction for the designated edit range.

This is a process of setting the variable speed reproduction according to the user operation for a specific edit range on the screen displayed by the variable speed tab 47, for example. For the designated edit range, the user can designate 2× speed, 4× speed, ½× speed, ⅓× speed, and the like with respect to normal 1× speed, for example. The image processing apparatus 1 reflects the setting on the data being edited.

When the repeat setting operation by the user is detected, the image processing apparatus 1 advances from step S112 to S230 and sets the repeat reproduction for the designated edit range.

This is a process of setting the repeat reproduction according to the user operation for a specific edit range on the screen displayed by the repeat tab 48, for example. For the designated edit range, the user can designate the number of repetitions, such as once, twice, and three times. The image processing apparatus 1 reflects the setting on the data being edited.

When the character input operation by the user is detected, the image processing apparatus 1 advances from step S113 to S240 and sets characters for the designated edit range.

This is a process of setting the characters to be superimposed on the video according to the input of the characters by the user for a specific edit range on the screen displayed by the character tab 49, for example. The user can arbitrarily input characters to a scene of a designated edit range, for example. The image processing apparatus 1 reflects the setting of the characters on the data being edited.

When the marker designation edit operation by the user is detected, the image processing apparatus 1 proceeds from step S114 to S250 and executes a setting changing process of the edit range for a designated marker.

For example, the user can perform an operation of using the edit pointer 34 to designate the start point or the end point of the edit range for a marker and then moving the edit pointer 34. This is the marker designation edit operation. In this case, the image processing apparatus 1 executes a process of changing the start point or the end point of the edit range to the time code position moved by the user operation.

Therefore, the user can arbitrarily change an arbitrary edit range.

When the marker kind designation edit operation by the user is detected, the image processing apparatus 1 proceeds from step S115 to S260 and executes a setting process of the edit range or the reproduction mode for the designated kind of marker.

For example, the user can perform an operation of designating a kind of marker and then instructing edit setting for changing the start point or the end point of the edit range for the marker, adding an image effect, or repeating the video. In response to the operation, the image processing apparatus 1 executes a process of adding the designated edit settings altogether to the specific kind of marker and reflects the settings on the data being edited.

For example, the user designates a motion pattern marker indicating a swing of a tennis racket. The user then instructs repeat reproduction for reproducing twice and designates ½× speed reproduction for the second repeat reproduction. The image processing apparatus 1 handles the setting as setting regarding the edit ranges for all of the same motion pattern markers and adds the setting to the edited data. As a result, a slow video is added right after the normal video in every scene of a swing in the edited video.

Furthermore, when, for example, the user performs an operation of designating a smile detection marker to change the start point of the edit range by 1 second in the past direction, the image processing apparatus 1 changes the start points of the edit ranges for all of the smile detection markers by 1 second in the past direction. The image processing apparatus 1 displays the changed state on the edit range bar 32 and reflects the change on the data being edited.

These are illustrative, there can be various other specific examples.

When an operation other than the operations described above is detected, the image processing apparatus 1 proceeds from step S116 to S270 and executes a process according to the operation.

When the image processing apparatus 1 determines that the image editing process is finished in step S117, the image processing apparatus 1 ends the display of the edit screen 20 in step S280.

The image processing apparatus 1 can provide the user with an edit environment of the video data in the process of FIGS. 9 to 14.

The process is an example, and there can be various other process examples.

For example, at the stage of step S103, the image processing apparatus 1 may perform the first edit range setting according to the markers to be displayed without waiting for the user operation and set the state of displaying the range images 35 on the edit range bar 32 as in FIG. 4 without notice.

Obviously, there can be other display content, operators, and the like in the edit screen 20.

5. Program and Storage Medium

Although the image processing apparatus 1 and the embodiment of the image processing method executed by the image processing apparatus have been described, the process for providing the edit environment can be executed by hardware and can be executed by software.

The program of the embodiment is a program for causing an arithmetic processing unit, such as a CPU (Central Processing Unit) and a DSP (Digital Signal Processor), to execute the process illustrated in the embodiment.

More specifically, the program of the embodiment is a program for causing the information processing apparatus to execute the step (S102) of recognizing the additional information added according to the time axis of the video data and the step (S130) of setting the edit range of the video data according to whether the recognized additional information is the first additional information for designating the specific point in time in the time axis of the video or the second additional information for designating the specific time range in the time axis of the video.

According to the program, the image processing apparatus that controls the automatic storage of still images can be realized by using the information processing apparatus of the computer apparatus 70 or the like of FIG. 2.

The program can be recorded in advance in an HDD as a recording medium built in the information processing apparatus of the computer apparatus 70 or the like, a ROM in a microcomputer including a CPU, or the like.

Alternatively, the program can be temporarily or permanently stored (recorded) in a removable recording medium, such as a flexible disk, a CD-ROM (Compact Disc Read Only Memory), an MO (Magnet optical) disk, a DVD (Digital Versatile Disc), a Blue-ray Disc (registered trademark), a magnetic disk, a semiconductor memory, and a memory card. The removable recording medium can be provided as so-called package software.

Furthermore, the program can be installed on a personal computer or the like from the removable recording medium or can be downloaded from a download site through a network, such as a LAN (Local Area Network) and the Internet.

Furthermore, the program is suitable for providing the image processing apparatus of the embodiment in a broad range. For example, the program can be downloaded to a personal computer, a mobile information processing apparatus, a mobile phone, a gaming device, a video device, or the like to allow the personal computer or the like to operate as the image processing apparatus of the present disclosure.

6. Summary and Modification

The following advantageous effects can be obtained in the embodiment.

In the image processing method executed by the image processing apparatus 1 of the embodiment, the additional information (marker) added according to the time axis of the video data is recognized, and the edit range of the video data is set according to whether the additional information is the first additional information for designating the specific point in time in the time axis of the video or the second additional information for designating the specific time range in the time axis of the video (see FIGS. 11 and 12).

Therefore, an appropriate edit range can be automatically set according to each piece of information including the first additional information indicating the specific point in time and the second additional information indicating the specific time range.

Particularly, the edit range is set based on the specific point in time designated by the first additional information when the marker is the first additional information, and the edit range is set based on the start point and the end point of the specific time range designated by the second additional information when the marker is the second additional information.

As a result, the edit range can be set according to specific content of the first and second additional information.

More specifically, the edit range is set to the range from the point in time that is the first set time period before the specific point in time to the point in time that is the second set time period after the specific point in time according to the marker of the first additional information, and the edit range is set to the range from the point in time that is the third set time period before the start point of the time range to the point in time that is the fourth set time period after the end point of the time range according to the marker of the second additional information.

The first set time period, the second set time period, the third set time period, and the fourth set time period are set, and appropriate time ranges can be automatically set as the edit ranges according to each pieces of the first and second additional information.

Particularly, a certain period before and after the designated time code can be the edit range in the case of the first additional information. As a result, a scene of a certain period around the time code designated by the marker can be the edit range. In a video, it is important to set the edit range to a scene of a certain period, and the setting of the edit range is significantly useful.

Furthermore, the point in time before the point in time designated by the marker is included in the edit range based on the first set time period and the third set time period, and this is also suitable. This is because the connection from the previous point in time in the video can be easily expressed only by the video of the edit range.

Furthermore, the point in time after the point in time designated by the marker is included in the edit range based on the second set time period and the fourth set time period, and this is also suitable. This is because the connection right after an important scene in the video can be easily expressed only by the video of the edit range.

Furthermore, the length of the edit range according to the first and second additional information can be accurately controlled based on the time period setting of the first to fourth set time periods. Therefore, it is also suitable that the user can select the first to fourth set time periods.

Furthermore, the set edit range is set as a range cut from the video data in the embodiment. More specifically, the set edit range is used as the edited video data obtained by editing the original video data. The edit ranges according to the first and second additional information can be cut to easily generate appropriate edited video data. That is, the respective edit ranges are scenes including the time codes indicated by various markers and are somewhat important scenes.

In that sense, it is desirable that the edit range be set for the kind of marker selected by the user. For example, when the user intends to create an edited video with a collection of smile scenes, the user can select and display the smile detection marker on the marker bar 31 (S200). The edit range setting (S130) can be executed for the smile detection marker, and the edited video can be created based on the set edit range (S150).

Note that the edit range set according to the first and second additional information may not be the range cut for the edited video data. The edit range may be, for example, a range for adding a special effect or a range for performing variable speed reproduction.

In the embodiment, the display is controlled to display and present the edit range set for the video data (S134). More specifically, the edit range is displayed as the range image 35 in the edit range bar 32.

This allows the user to recognize the automatically set edit range.

In the embodiment, the display is controlled to present the specific point in time in the video data designated by the first additional information. More specifically, the image processing apparatus 1 controls the display of the marker image 33 of the marker bar 31.

This allows the user to recognize the specific point in time designated by the first additional information.

Furthermore, the user can easily check the details of each edit range and the position on the video time axis after the setting of the edit range, and subsequent arbitrary editing is facilitated.

In the embodiment, the display is also controlled to indicate the representative point in time to present the specific time range in the video data designated by the second additional information.

More specifically, the image processing apparatus 1 controls the display of the marker image 33 of the marker bar 31. In this case, for the marker as the second additional information, the display is in accordance with a representative time code, instead of the entire edit range, as in the upper section of FIG. 5B.

This allows the user to recognize the specific time range designated by the second additional information. Particularly, the specific time range is indicated by the representative point in time instead of indication of the time range, and this can prevent the display from becoming complicated.

Furthermore, the user can easily check the details of each edit range and the position on the video time axis after the setting of the edit range, and subsequent arbitrary editing is facilitated.

In the embodiment, the display is controlled to reproduce and display the video based on the information of the set edit range (S160).

More specifically, while one or a plurality of edit ranges are set for the video data, the edit ranges are cut to reproduce and display the edit ranges. For example, the plurality of edit ranges are sequentially cut to continuously reproduce the video.

The video reproduction allows the user to actually check the state of the edited video generated based on the edit range setting. The user can check the edit video to further perform the editing and the like as necessary.

In the embodiment, the edit operation corresponding process of changing the setting of the set edit range according to the operation is executed (S250, S210).

More specifically, the user can perform an operation to arbitrarily change the setting of the edit range set for the video data. For example, the user is allowed to change the start point (in-point) or the end point (out-point) of the edit range, delete an edit range, and add an edit range by operation.

This allows the edit range set based on the additional information to be further changed according to the intention (operation) of the user.

In the embodiment, the edit operation corresponding process of changing the image reproduction mode of the set edit range according to the operation is executed (S220, S230, S240).

The edit range set for the video data is added to the edited video as a video for normal reproduction, such as a video for normal display at 1× speed. The user operation is allowed to add processes, such as variable speed reproduction, image effect, repeat, and character superimposition, to the video of the edit range.

Therefore, the edited video generated based on the set edit range can be further edited in a reproduction mode intended by the user, and advanced editing is possible.

In the embodiment, the edit operation corresponding process of designating the kind of a plurality of types of markers as additional information serving as the first additional information or the second additional information and setting a predetermined image reproduction mode in the edit ranges corresponding to the designated kind of marker is executed (S260).

Therefore, the kind of marker can be designated to set a common image reproduction mode for the edit ranges corresponding to the kind of marker. For example, it is possible to designate the slow reproduction for all of the edit ranges corresponding to the specific additional information.

Therefore, details of editing can be designated for each kind of marker, and the edit operation can be efficient and easy. Furthermore, an image effect and the like can be set according to the details of a specific scene.

In the embodiment, one of the first set time period, the second set time period, the third set time period, and the fourth set time period is variably set according to the kind of marker in setting the edit range of the video data (FIG. 12).

As a result, an appropriate edit range can be set for each kind of marker. For example, the edit range is set according to the scene by changing the previous and following time lengths according to the additional information of each content of the scene, the additional information based on user operation, the additional information based on smile detection, and the like.

Particularly, one of the first set time period and the third set time period is set to a time length longer than the normally set time length when the marker is derived from operation, that is, when the marker is added according to the user operation during the video shooting.

The designated time period position of the additional information set according to the user operation is usually delayed. Therefore, a longer time length is set for the additional information. As a result, the start time point of the edit range can be an earlier point in time, and the edit range of appropriate video content can be set.

In the embodiment, the output process of generating and outputting the edited video data is executed based on the information of the set edit range (S150, FIG. 13).

While one or a plurality of edit ranges are set for the video data, or while the edit ranges are further changed, the edit ranges are cut and connected to generate the edited video data, for example. The edited video data to be generated is an edited video on the basis of the edit ranges based on the additional information, and edited video content appropriate for the user can be provided by a simple process.

In the output process, the edited video data is stored in a storage medium or transmitted to an external device. This allows the user to easily save or forward the edited data.

The image processing apparatus 1 of the embodiment can be widely applied in consumer devices as well as broadcasting and other business devices. For example, the image processing apparatus 1 can be built in a camera device with a video shooting function, a mobile terminal device, a mobile phone, a monitoring camera device, a fixed point camera device, an on-board camera device such as a drive recorder, a camera device for determining the driving environment, a medical device, an electronic endoscope, and the like, and it is also suitable to form a system with these devices.

Note that the advantageous effects described in the present specification are illustrative only, and the advantageous effects are not limited. Further, there can be other advantageous effects.

Note that the present technique can also be configured as follows.

(1)

An image processing method including:

recognizing additional information added according to a time axis of video data; and setting an edit range of the video data according to whether the additional information is first additional information for designating a specific point in time in the time axis of the video or second additional information for designating a specific time range in the time axis of the video.

(2)

The image processing method according to (1), further including:

setting the edit range based on the specific point in time designated by the first additional information when the additional information is the first additional information; and setting the edit range based on a start point and an end point of the specific time range designated by the second additional information when the additional information is the second additional information.

(3)

The image processing method according to (1) or (2), further including:

setting the edit range to a range from a point in time that is a first set time period before the specific point in time to a point in time that is a second set time period after the specific point in time according to the first additional information; and setting the edit range to a range from a point in time that is a third set time period before the start point of the time range to a point in time that is a fourth set time period after the end point of the time range according to the second additional information.

(4)

The image processing method according to any one of (1) to (3), further including:

setting the set edit range as a range cut from the video data.

(5)

The image processing method according to any one of (1) to (4), further including:

controlling display to display and present the edit range set for the video data.

(6)

The image processing method according to any one of (1) to (5), further including:

controlling the display to present the specific point in time in the video data designated by the first additional information.

(7)

The image processing method according to any one of (1) to (6), further including:

controlling the display to indicate a representative point in time to present the specific time range in the video data designated by the second additional information.

(8)

The image processing method according to any one of (1) to (7), further including:

controlling the display to reproduce and display the video based on information of the set edit range.

(9)
The image processing method according to any one of (1) to (8), further including:
executing an edit operation corresponding process of changing the setting of the set edit range according to an operation.

(10)
The image processing method according to any one of (1) to (9), further including:
executing an edit operation corresponding process of changing an image reproduction mode of the set edit range according to an operation.

(11)
The image processing method according to any one of (1) to (10), further including:
executing an edit operation corresponding process of designating a kind of a plurality of types of additional information as additional information serving as the first additional information or the second additional information and, according to the designation, setting a predetermined image reproduction mode in the edit ranges corresponding to the designated kind of additional information.

(12)
The image processing method according to (3), further including:
variably setting one of the first set time period, the second set time period, the third set time period, and the fourth set time period according to a kind of a plurality of types of additional information as additional information serving as the first additional information or the second additional information in setting the edit range of the video data.

(13)
The image processing method according to (12), further including:
setting one of the first set time period and the third set time period to a time length longer than a normally set time length when the kind of the additional information is additional information added according to a user operation during video shooting.

(14)
The image processing method according to any one of (1) to (13), further including:
executing an output process of generating and outputting edited video data based on the information of the set edit range.

(15)
The image processing method according to (14), further including:
in the output process, executing an output process of storing the edited video data in a storage medium.

(16)
The image processing method according to (14) or (15), further including:
in the output process, executing an output process of transmitting the edited video data to an external device.

(17)
An image processing apparatus including:
a recognition unit that recognizes additional information added according to a time axis of video data; and
an edit processing unit that sets an edit range of the video data according to whether the additional information recognized by the recognition unit is first additional information for designating a specific point in time in the time axis of the video or second additional information for designating a specific time range in the time axis of the video.

(18)
A program causing an information processing apparatus to execute:
a step of recognizing additional information added according to a time axis of video data; and
a step of setting an edit range of the video data according to whether the recognized additional information is first additional information for designating a specific point in time in the time axis of the video or second additional information for designating a specific time range in the time axis of the video.

REFERENCE SIGNS LIST

1 . . . Image processing apparatus, 2 . . . Target recognition unit, 3 . . . Edit processing unit, 4 . . . Output processing unit, 10 . . . Storage unit, 11 . . . Communication unit, 12 . . . Input unit, 13 . . . Display unit, 14 . . . Voice output unit

The invention claimed is:

1. An image processing method comprising:
recognizing, with an electronic processor, metadata added to video data in parallel to the video data being captured, the metadata being associated with one or more points in time along a time axis of the video data;
determining, with the electronic processor, whether the metadata is first additional information for designating a specific point in time in the time axis of the video data or second additional information for designating a specific time range in the time axis of the video data; and
setting, with the electronic processor, an edit range of the video data based on the determination of whether the metadata is the first additional information or the second additional information,
wherein in response to determining that the metadata is the first additional information, setting the edit range at the specific point in time designated by the first additional information; and
wherein in response to determining that the metadata is the second additional information, setting the edit range at a start point and an end point of the specific time range designated by the second additional information,
wherein setting the edit range at the specific point in time designated by the first additional information further includes setting the edit range to a first range from a first point in time that is a first set time period before the specific point in time to a second point in time that is a second set time period after the specific point in time according to the first additional information, and
wherein setting the edit range at the start point and the end point of the specific time range designated by the second additional information further includes setting the edit range to a second range from a third point in time that is a third set time period before the start point of the specific time range to a fourth point in time that is a fourth set time period after the end point of the specific time range according to the second additional information, and
wherein setting the edit range of the video data further includes variably setting one of the first set time period, the second set time period, the third set time period, or the fourth set time period based on one type of a plurality of types of metadata serving as the first additional information or the second additional information.

2. The image processing method according to claim 1, wherein setting the edit range further includes setting the edit range as a range cut from the video data.

3. The image processing method according to claim 1, further comprising:
controlling a display to display and present the edit range that is set for the video data.

4. The image processing method according to claim 3, further comprising:
controlling the display to present the specific point in time in the video data designated by the first additional information.

5. The image processing method according to claim 3, further comprising:
controlling the display to indicate a representative point in time to present the specific time range in the video data designated by the second additional information.

6. The image processing method according to claim 3, further comprising:
controlling the display to reproduce and display the video data based on information of the edit range that is set.

7. The image processing method according to claim 1, further comprising:
receiving an edit operation to edit the edit range that is set; and
changing the edit range that is set based on the edit operation that is received.

8. The image processing method according to claim 1, further comprising:
receiving an edit operation to edit an image reproduction mode of the edit range that is set; and
changing the image reproduction mode of the edit range that is set based on the edit operation that is received.

9. The image processing method according to claim 1, further comprising:
designating the one type of the plurality of types of metadata serving as the first additional information or the second additional information; and
setting a predetermined image reproduction mode in the edit range based on the one type of the plurality of types of metadata that is designated as the first additional information or the second additional information.

10. The image processing method according to claim 1, further comprising:
setting one of the first set time period and the third set time period to a time length longer than a normally set time length when the one type of the metadata is added to the video data according to a user operation during video shooting of the video data.

11. The image processing method according to claim 1, further comprising:
generating and outputting edited video data based on information of the edit range that is set.

12. The image processing method according to claim 11, further comprising:
storing the edited video data in a storage medium.

13. The image processing method according to claim 11, further comprising:
transmitting the edited video data to an external device.

14. An image processing apparatus comprising:
a memory; and
an electronic processor communicatively connected to the memory, the electronic processor is configured to
recognize metadata added to video data in parallel to the video data being captured, the metadata being associated with one or more points in according to a time axis of the video data;
determine whether the metadata is first additional information for designating a specific point in time in the time axis of the video data or second additional information for designating a specific time range in the time axis of the video data, and
set an edit range of the video data based on the determination of whether the metadata is the first additional information or the second additional information,
wherein in response to determining that the metadata is the first additional information, setting the edit range at the specific point in time designated by the first additional information; and
wherein in response to determining that the metadata is the second additional information, setting the edit range at a start point and an end point of the specific time range designated by the second additional information,
wherein setting the edit range at the specific point in time designated by the first additional information further includes setting the edit range to a first range from a first point in time that is a first set time period before the specific point in time to a second point in time that is a second set time period after the specific point in time according to the first additional information, and
wherein setting the edit range at the start point and the end point of the specific time range designated by the second additional information further includes setting the edit range to a second range from a third point in time that is a third set time period before the start point of the specific time range to a fourth point in time that is a fourth set time period after the end point of the specific time range according to the second additional information, and
wherein setting the edit range of the video data further includes variably setting one of the first set time period, the second set time period, the third set time period, or the fourth set time period based on one type of a plurality of types of metadata serving as the first additional information or the second additional information.

15. The image processing apparatus according to claim 14, wherein the electronic processor is further configured to set one of the first set time period and the third set time period to a time length longer than a normally set time length when the one type of the metadata is added to the video data according to a user operation during video shooting of the video data.

16. The image processing apparatus according to claim 14, wherein the electronic processor is further configured to control a display to display and present the edit range that is set for the video data.

17. A non-transitory computer-readable medium comprising a program that, when executed by an electronic processor, causes the electronic processor to perform a set of operations comprising:
recognizing metadata added to video data in parallel the video data being captured, the metadata being associated with one or more points in time along a time axis of the video data;
determining whether the metadata is first additional information for designating a specific point in time in the time axis of the video data or second additional information for designating a specific time range in the time axis of the video data; and
setting an edit range of the video data based on the determination of whether the metadata is the first additional information or the second additional information, wherein in response to determining that the metadata is the first additional information, setting the edit range at the specific point in time designated by the first additional information; and wherein in response to determining that the metadata is the second additional information, setting the edit range at a start point and an end point of the specific time range designated by the second additional information, wherein setting the edit range at the specific point in time designated by the first additional information further includes setting the edit range to a first range from a first point in time that is a first set time period before the specific point in time to a second point in time that is a second set time period after the specific point in time according to the first additional information, and wherein setting the edit range at the start point and the end point of the specific time range designated by the second additional information further includes setting the edit range to a second range from a third point in time that is a third set time period before the start point of the specific time range to a fourth point in time that is a fourth set time period after the end point of the specific time range according to the second additional information, and wherein setting the edit range of the video data further includes variably setting one of the first set time period, the second set time period, the third set time period, or the fourth set time period based on one type of a plurality of types of metadata serving as the first additional information or the second additional information.

18. The non-transitory computer-readable medium according to claim 17, wherein the set of operations further includes setting one of the first set time period and the third set time period to a time length longer than a normally set time length when the one type of the metadata is added to the video data according to a user operation during video shooting of the video data.

* * * * *